United States Patent [19]

Hunter et al.

[11] 3,710,328

[45] Jan. 9, 1973

[54] METHOD AND APPARATUS FOR COMMUNICATING DEVICES EACH PERFORMING PREPROCESSING OPERATIONS ON DATA AUTONOMOUSLY OF THE CENTRAL PROCESSOR

[75] Inventors: John C. Hunter, Phoenix, Ariz.; Albert L. Beard, Phoenix, Ariz.

[73] Assignee: Honeywell Information Systems Inc., Waltham, Mass.

[22] Filed: Jan. 21, 1971

[21] Appl. No.: 108,284

[52] U.S. Cl. ....................340/172.5

[51] Int. Cl. ....................G06f 3/00

[58] Field of Search ....................340/172.5

[56] References Cited

UNITED STATES PATENTS

| | | | |
|---|---|---|---|
| 3,618,039 | 11/1971 | Baltzly | 340/172.5 |
| 3,274,561 | 9/1966 | Hallman | 340/172.5 |
| 3,283,308 | 11/1966 | Klein | 340/172.5 |
| 3,407,387 | 10/1968 | Looschen | 340/172.5 X |
| 3,408,632 | 10/1968 | Hauck | 340/172.5 |
| 3,411,143 | 11/1968 | Beausoleil | 340/172.5 |
| 3,462,741 | 8/1969 | Bush | 340/172.5 |
| 3,564,509 | 2/1971 | Perkins | 340/172.5 |

*Primary Examiner*—Paul J. Henon
*Assistant Examiner*—Sydney R. Chirlin
*Attorney*—Fred Jacob, Edward W. Hughes and Edward A. Gerlaugh

[57] ABSTRACT

Communicating devices in a data processing system operate in a data-altering mode to perform processing operations autonomously of the central processor. The operations are performed within limits prescribed by broad-function parameters from the central processor, thus relieving the central processor of preprocessing operations. Each device issues discrete instructions comprising an operation part and a store address part for performing operations on data items supplied by the device itself, as well as on data in the system store.

10 Claims, 23 Drawing Figures

INVENTOR.
JOHN C. HUNTER
ALBERT L. BEARD
BY James A. Pershon

METHOD AND APPARATUS FOR COMMUNICATING DEVICES EACH PERFORMING PREPROCESSING OPERATIONS ON DATA AUTONOMOUSLY OF THE CENTRAL PROCESSOR

BACKGROUND OF THE INVENTION

1. Field of the Invention

This invention relates to the electronic data processing art and, more particularly, to apparatus for relieving the central data processor in a data processing system of ancillary preprocessing operations.

2. Description of the Prior Art

During the evolution of the general purpose digital computer, the principal goals of both manufacturers and users were oriented toward the development of increasingly powerful machines for the batch processing of information. A consequent increase in the requirement for digesting masses of data from a variety of communicating devices and supplying voluminous processed results, led to the development of a number of sophisticated approaches for coping with the flood of information. Larger, more complex and correspondingly more expensive systems and combinations of systems operating in synchronism were developed. Growing in both size and complexity, the central processing unit became both functionally and physically segmented into other units, each of which performed a task ancillary to the prime function of the central processing unit; i.e., the actual processing or the performance of highly complex mathematical computations on data items. The increase of the rate of data item transfers to and from the store unit and the need for additional storage area also caused a corresponding increase in the size and complexity of store units.

To effect the transfer of data items between the store unit and the communicating devices of the data processing system, some prior art systems have depended on complete program control of such transfers, implemented as a subset of the batch processing system. Other systems used special data items called control words or descriptors associated with each communicating device to direct a transfer. In implementing the latter method it has been the practice to store complete control information in the data processing system store for each communicating device.

In other prior art data processing systems where the evanescence of data supplied by real-time communicating devices was an important factor, another attempt to solve the problem of mass data movement was the use of autonomous data communications processing equipment. In such a system, a communications processor assumed the responsibility of interfacing with a variety of communicating devices or terminals, thus relieving the central data processor of the communications functions. The central processor was thus allowed to devote more of its capabilities to the tasks for which it is best suited.

Prior art systems which effect a data transfer completely under program control consumed far too much of the central processor's available time in executing transfer operations. Likewise, systems with apparatus to automatically execute these operations solely by using control words or descriptors to direct information transfers are usually highly complex and costly. Further, the time required to initiate and monitor these operations reduces the effective speed of the central processor for its prime tasks.

Some prior art data processing systems attempted to alleviate the problem of excessive demands on the central processor for data movement tasks by relegating these operations to the previously mentioned, functionally separate units; e.g., store-unit controllers, input/output controllers, or data communications processors or controllers. Although the central processor was thus relieved of ancillary tasks, the data processing system was still required to sacrifice memory storage space which could otherwise have been used for normal data processing operations. Larger store was, of course, provided, but this again added greatly to the overall cost of the data processing system.

Other prior art data processing systems also attempted to alleviate the data movement problem by providing control signals supplied by the communicating device itself. Such control signals directly controlled the central processor to effect communication between the communicating device and the store unit of the data processing system. In such systems the communicating device, when preparing to communicate with the other units in the system, delivered signals uniquely representative of the one of many types of operations the particular communicating device may have required. Upon granting access to the device, the central processor halted execution of its normal sequence of instruction and responded directly to the signals supplied by the device to provide the type of data processing operation, or data transfer functions, or both, as required by the device granted access. Accordingly, the data processing system was partially freed of the time consuming burden of preparing signals to control the particular type of information transfer or computation required by the particular one of the plurality of diverse communicating devices to which access was granted.

SUMMARY OF THE INVENTION

The present invention provides a new and improved method and apparatus in a general purpose data processing system for preprocessing data supplied by a plurality of diverse communicating devices.

The preferred embodiment of the present invention describes a data processing system having a plurality of diverse communicating devices in which each communicating device is supplied initially, either by action of the central processor in response to the system supervisory program, or upon demand of the device itself, with a descriptor message or broad-function command (BFC) from the store-unit. The broad-function command provides operational parameters for use by the communicating device in formulating a series of discrete instructions to perform operations on data items. Only broad parameters; e.g., the assignment of a block of store for operational use by the communicating device, are supplied. The parameters supplied to any one communicating device may vary with the particular function performed by the device. When the functional relationships between the communicating device and the central data processor are established, the device functions autonomously of the central processor within the framework of the parameters supplied.

Apparatus in each of the communicating devices generate discrete instructions comprised of an operation part and at least one store address part for performing operations on data items in store as well as on input data items supplied by the device itself, independently of operations being performed by the central processor. Certain discrete instructions generated by the communicating device may cause the execution of arithmetic operations within another unit of the data processing system, separate from those performed in the central processor. The results of an arithmetic operation thus executed by direction of a first portion of the operation part of a discrete instruction, may serve in conjunction with a second portion of the aforementioned operation part either to alter subsequent discrete instructions or to notify the central processor that the functional framework established by the original broad-function command has been exceeded, and that new parameters are needed. A notification to the central processor is accomplished by means of a conditional interrupt command which forms the second portion of the operation part of the discrete instruction issued by the communicating device.

It is, therefore, an object of the present invention to provide an improved, extremely flexible, general purpose data processing system.

It is also an object of this invention to provide improved apparatus for effecting the transfer of information items between communicating devices and other units of a data processing system.

It is a further object of the present invention to provide an improved data transfer system with preprocessing capabilities which is simple in its concept and which uses a minimum of components and associated logic circuitry to achieve its intended purpose, without a corresponding increase in the size of the memory unit serving the system.

An additional object of this invention is to provide in a data processing system a method for preprocessing data items for a plurality of diverse communicating devices.

It is still another object of this invention to provide apparatus which are capable of directing and performing programmable functions requisite to a particular communicating device, thus extending the capabilities of the central processor, as well as other units of the data processing system.

It is a further object of this invention to provide a general purpose data processing system in which a central processor performs a broad range of diverse functions in concert with a plurality of diverse communicating devices to relieve the central processor of time consuming ancillary computations to an extent commensurate with the demands of the particular communicating device.

Another object of the present invention is to provide general purpose information processing apparatus including a central processor which communicates with a plurality of diverse communicating devices by way of a common memory unit, wherein each communicating device generates discrete instructions for performing preprocessing operations on data items supplied by the device itself, as well as on data items already in memory, independently of operations being performed by the central processor.

Other objects and advantages of the invention will be apparent from the following description and embodiment taken in conjunction with the accompanying claims and drawings.

DESCRIPTION OF THE PREFERRED EMBODIMENT

Figure 1:
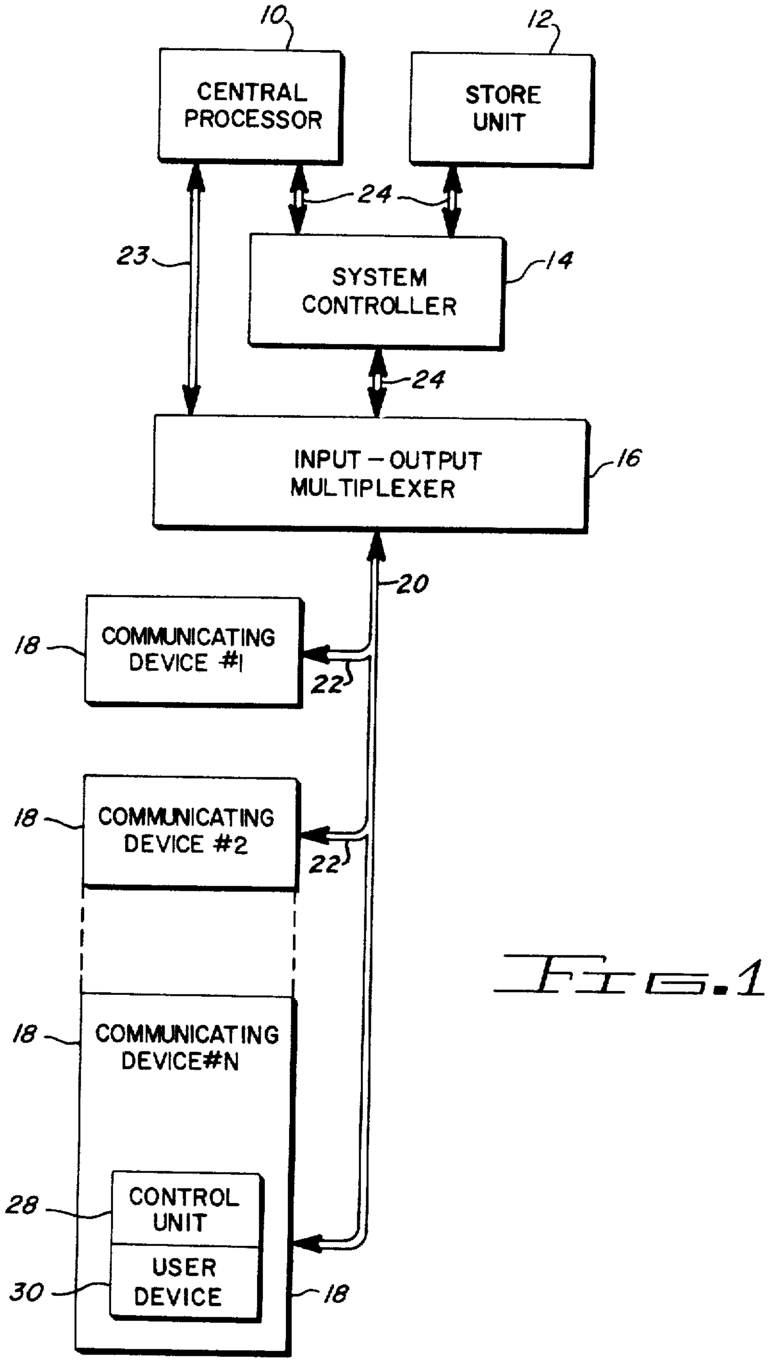
FIG. 1 is a simplified block diagram of a general purpose data processing system embodying the principals of the present invention.

In FIG. 1 there is shown a basic system structure for a general purpose data processing system comprising a central processor 10, operating in concert with a plurality of communicating devices 18, labeled communicating device 1, 2, through communicating device N. The central processor 10 operates with the communicating devices 18 through an input-output multiplexer (IOM) 16, and a system controller 14, the system controller providing access to a store unit 12. The store unit 12 contains a plurality of data items including instructions and control words.

The central processor 10 responds to the plurality of distinct instructions and data items which are contained in the store unit 12. From these instructions, which are supplied to the central processor in a sequential manner as is customary in the art, the central processor is controlled to manipulate the data items in the store unit 12 thus performing the functions for which the data processing system is designed. The store unit 12 may be any of the several well-known types capable of having the stored contents thereof selectively altered. In the embodiment presently being described, the store unit 12 is a random-access, coincident-current type store, having a plurality of discrete addressable locations, each of which provides for the storage of a unit of data, also commonly called a word. For the purposes of this discussion, a "data item" may include one or more words. Words thus stored may be, for example, data items which are the result of processing, data items which are to be processed, instructions, and auxiliary data items called "control words" or "descriptors" which perform special control functions. Briefly, such auxiliary data items in the present embodiment include indirect control words (ICW), broad-function commands (BFC), and status words.

The input-output multiplexer (IOM) 16 provides for the orderly sequencing of information transfers between the communicating devices 18 and the other units of the data processing system, as well as performing other functions common to the communicating devices 18 that will be expanded upon as the description proceeds.

The communicating devices 18 are comprised of two portions, a control unit 28 and a user device 30, shown in communicating device N. The user device 30 may operate with external data bearing media such as magnetic tape or discs, punched cards, or printed documents. Other user devices may handle only electrical signals. Examples of the latter are communications multiplexers, process control apparatus, and video display units. Regardless of the type, however, the operation of the user devices 30 is regulated by the control unit 28. The control unit 28 generally functions only with the particular user device 30 with which it is associated and provides device-level control as well as a standard interface connection for data and control signal lines between the communicating device 18 and the IOM 16. The control unit 28, although functionally an integral part of the communicating device N, may be located physically remote from the IOM 16 with the user device 30, or housed in the vicinity of the IOM. A main transfer bus 20 serves to connect each of the communicating devices 18 to the IOM 16, by way of individual device buses 22. Each of the device buses 22 connects a separate communicating device 18 to the common bus 20.

Before proceeding, it would be advantageous to point out the conventions used in the ensuing discussion. The lines interconnecting the various components illustrated in the drawings represent paths of data and control communication. A double line represents a bus or more particularly a parallel transfer path for multiple signals normally comprising: a plurality of individual signals, a group of signals forming a single data entity, or a combination of such signals and groups of data entities. Buses 24 which connect the system controller 14 to the central processor 10, to the store unit 12, and to the IOM 16 are examples. Individual signals are represented by single solid lines.

Figure 3A:
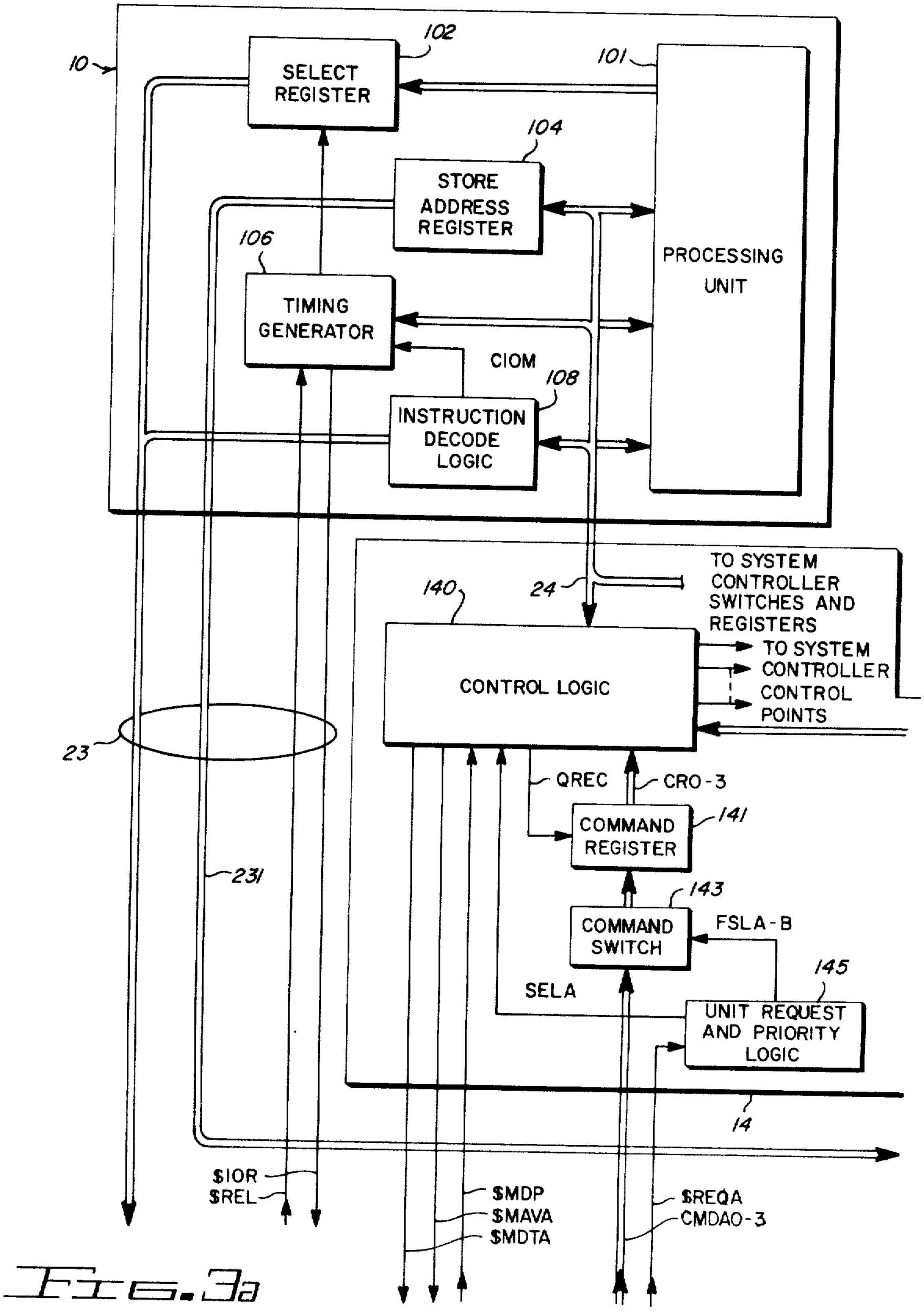
FIGS. 3*a* through 3*f* when arranged as shown in FIG. 3*g* illustrate in greater detail the data processing system of FIG. 1.

A further convention used is the assignment of a three-digit reference number to a bus or a signal lead which forms a part of a previously identified bus, the first two digits being the reference number of the previously identified bus. For example, a function address bus 231 (FIG. 3*a*) forms a part of a CP/IOM bus 23 of FIG. 1.

The connection between the IOM 16 and the control unit 28 of a particular communicating device is called a common interface. This means that all the control and data signal lines interconnecting the IOM 16 with each of the communicating devices 18 are identical. The differences in device level function and control are resolved in the individual communicating device control units, with the functions generic to all devices merging on a time-shared basis in the IOM 16.

In the present system a communicating device may be one of two basic operational types: dynamic or static. A static device may not operate independently and therefore does not request service from the IOM. When it is commanded to do so by the supervisory program, a static channel merely supplies data to the IOM or accepts data transferred from the IOM.

Dynamic communicating devices are those capable of independent operation. A particular dynamic device may operate in either the direct or indirect mode. In the indirect mode a communicating device is assigned one or more locations in the store unit 12 in which descriptors or indirect control words (ICW) are placed by the supervisory program. An ICW may contain operational parameters for the corresponding communicating device, as for example, the number of data items to be transferred, and the storage location address to be involved in the transfer of data items. In the indirect mode, the IOM 16 maintains the data-item transaction store-unit address and the data-item count by accessing and updating an ICW for each data-item transaction performed by the communicating device.

A communicating device which operates in the direct mode is capable of maintaining its own data-item transaction addresses and data-item count, independently of the IOM. Only one data-operation cycle is performed by the IOM in response to a request from a communicating device. The data-operation cycle may, however, include more than one store-unit cycle. A communicating device supplies at least one request for each data item in order to process a block of data. Simultaneous requests from two or more devices are handled on a priority basis, allowing the IOM to multiplex all channels.

Figure 2:
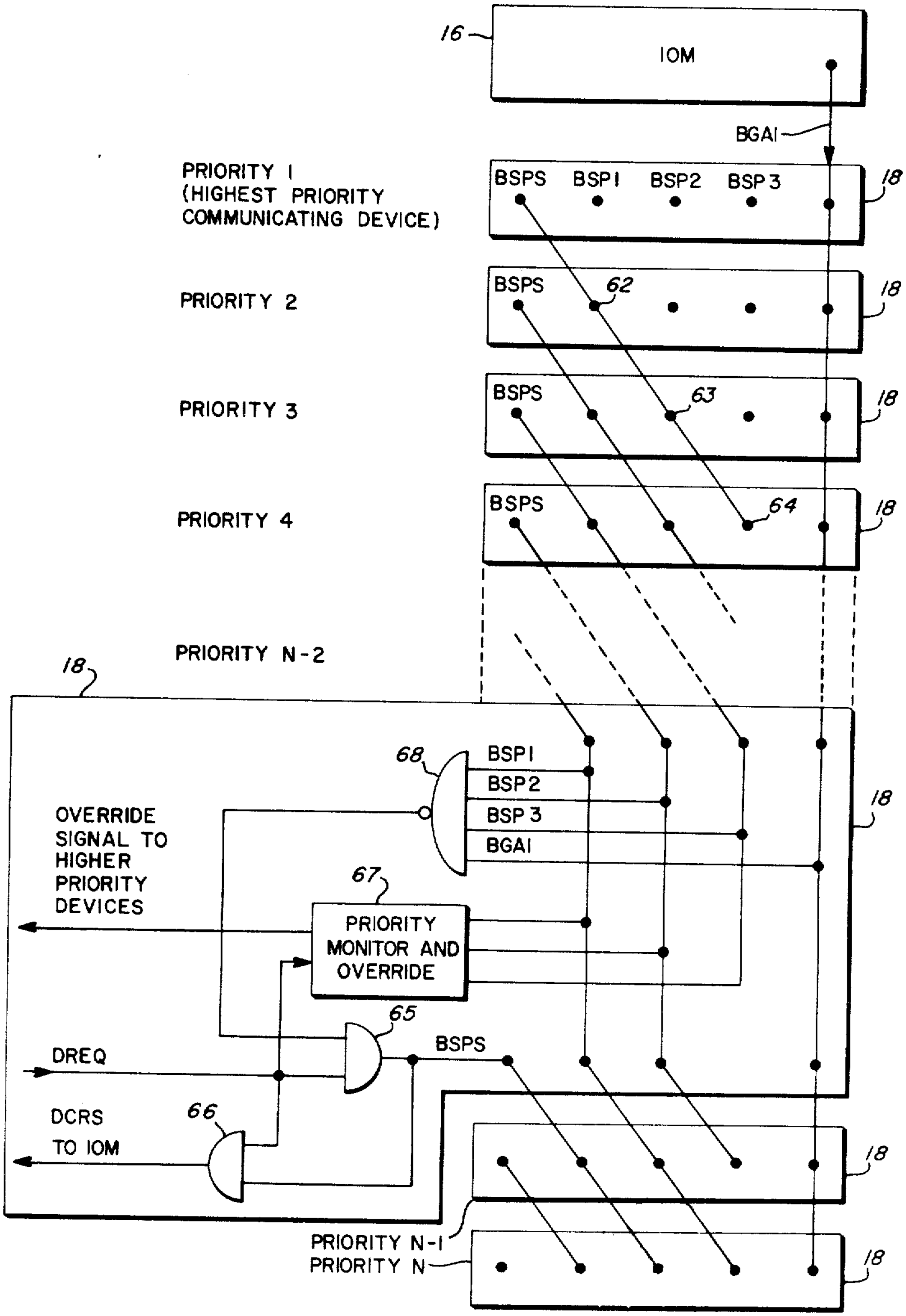
FIG. 2 shows the signal interconnections between communicating devices and the IOM which establish priority of access to the I/O bus for each device.

Access to the IOM common bus 20 is controlled by a hardware assigned priority scheme, shown in FIG. 2. Referring to FIG. 2, the IOM 16 and the plurality of communicating devices 18 are shown arranged in order of descending priority, the highest priority device labeled priority 1; the next highest, priority 2, and so on through the last and lowest priority device, labeled priority N. Only the device-to-device priority wiring is shown. A representative one of the plurality of communicating devices 18, labeled priority N–2, shows a typical priority logic circuit for a typical device.

Each communicating device 18 is shown having five control signal terminals, the signal names for the corresponding terminals of each device being as shown on the priority 1 device, viz, from left to right respectively: BSPS, BSP1, BSP2, BSP3, and BGAI. The method of interconnecting the control signals between the communicating devices 18 and the associated logic circuits in each device controls the access of the individual devices to the IOM 16 on a priority basis. The relative priority of each communicating device 18 is predetermined and implemented by connecting the appropriate control signal lines via the individual device buses 22 between the communicating devices as shown (see also FIG. 4).

When a particular communicating device 18 such as the representative device labeled priority N–2 desires service from the IOM 16, a signal DREQ is enabled internally within the device and applied to AND-gates 65 and 66. The second input to AND-gate 65 is the output of a four-input NAND logic element 68. If any of the four inputs to NAND gate 68 is enabled, there will be no output, thus disabling AND-gate 65. If no device with a higher priority than N–2 is active, all four input signals to the NAND-gate 68 are disabled, and the output of the gate is thus enabled. The enabled output of the NAND-gate 68 will in turn enable AND-gate 65, when the DREQ signal is enabled. The enabled output of AND-gate 65, the BSPS signal, serves to enable AND-gate 66. AND-gate 66 generates a signal DCRS which is subsequently transferred to the IOM 16 as a BCRS service request signal indicating that a communicating device is requesting service.

The BSPS signal from AND-gate 65 is also transferred by the signal buses which interconnect the communicating devices to the device with the next lower relative priority, in this case the priority N–1 device, becoming in that device the BSP1 signal.

The priority interconnection and notification method is further illustrated by considering the BSPS signal generated in the priority 1 communicating device. The BSPS signal is transferred to the BSP1 terminal 62 of the priority 2 device. The signal is further transferred to the BSP2 terminal 63 of the priority 3 device. Lastly, in the priority 4 device, the BSPS signal originally generated in the priority 1 device becomes the BSP3 signal on terminal 64. Thus when the BSPS signal is enabled, all devices having a lower priority than the device generating the signal are inhibited from accessing the IOM.

The BGAI signal is generated in the IOM 16 and transferred via the interconnecting buses to all communicating devices 18 as the fourth input to NAND-gate 68 in each device as shown in the representative communicating device 18, labeled priority N–2. The BGAI signal is generated to inhibit all devices, when an IOM activity requires that active communication with all devices be temporarily suspended. Such an activity is the broad-function command (BFC) transaction, to be explained in another portion of this description.

NAND-gate 68 serves in each communicating device to inhibit the particular device from accessing the IOM 16 for service if a device with higher priority is also requesting service. Each communicating device thus passes its priority and the priority of the devices above it to the devices below it on the BSPS line. The BSPS signal of a particular device is therefore the inhibit-access input for the three channels below. The trickle-down interconnection of priority signals may significantly reduce the time delay for access by a particular device to the IOM 16 since each communicating device 18 can determine the status of devices up to three priority levels higher by monitoring the BSP signals with conventional circuits, as for example shown in FIG. 2, by a priority monitor and override 67. The priority monitor and override 67 may be optionally provided within individual devices for selectively overcoming the access granted to a higher priority device when the need arises. Multiple priority levels may thus be established.

Returning now to FIG. 1, the central processor 10, the store unit 12, and the IOM 16 are shown interconnected by the systems controller 14 by way of appropriate connecting lines and buses which serve to provide transfer paths for the requisite control and data signals. The system controller 14 coordinates communications between the store unit 12 and the other system components, and performs certain additional tasks appropriate to the present invention as will become apparent as the description proceeds.

The central processor 10 and the IOM 16 are considered active units and each processes data at its independent rate, requesting communication via the system controller 14 from the store unit 12, a passive unit, as the need arises. The only knowledge regarding store-unit availability that one active unit has of the other is that a store-unit communication request may be delayed while the store unit 12 is responding to the other active unit through the system controller 14. The system controller 14 thus controls access to the memory 12 and also provides one path for communication control between the processor 10 and the IOM 16. An alternate, direct path for communication control between the central processor 10 and the IOM 16, is provided by the CP/IOM bus 23. The system controller 14 also acts as a data-processing coordinating device for overseeing inter-system communication as well as performing certain functions within itself.

Figure 3G:
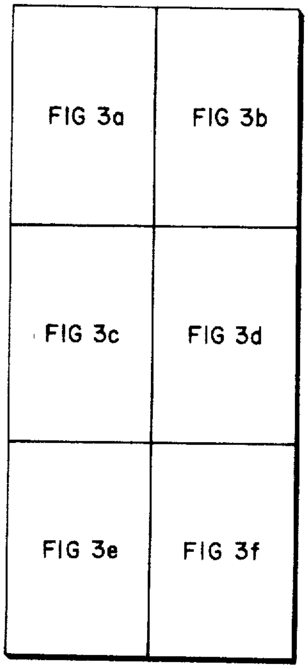
FIG. 3 is a composite drawing in six parts.
Figure 3B:
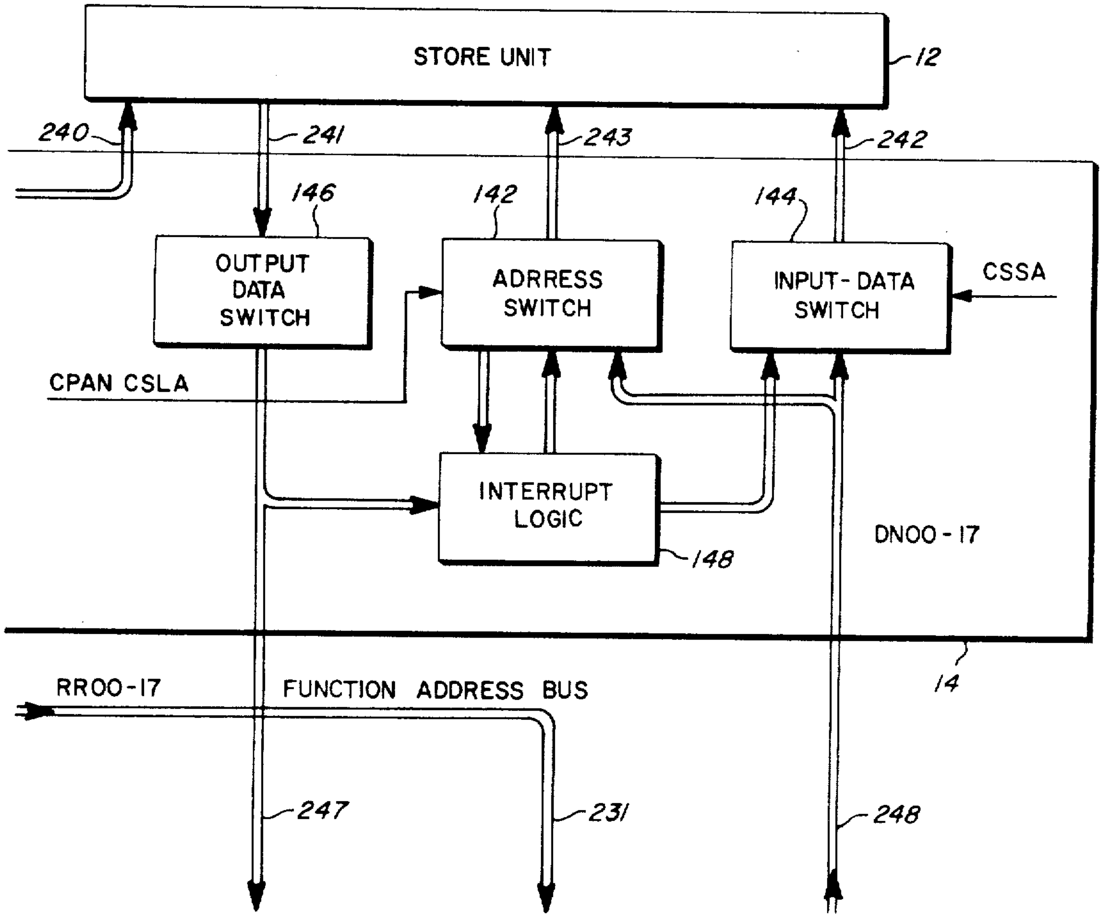

Referring now to FIGS. 3*a* through 3*f*, which are to be connected together as shown in FIG. 3*g*, and considered as a single Figure for analysis, the organization of the data processing system registers, control-logic elements, data paths, unit interfaces, and information-transfer buses will now be described.

In order to achieve meaningful and orderly movements of information and data items among the various units, registers and other elements of the data processing system, after a need for specific movements and combination of movements has been established, control signals and timing pulses must be generated or issued to permit the prescribed movement at the desired time. Any undesirable movements must similarly be inhibited. The exact manner in which specific control signals are logically derived and timing pulses are generated from a clock source or a time-delay network according to precisely defined conditions within a data processing system at certain precisely defined times has become a matter of common knowledge within the art. Therefore, in the ensuing discussion no attempt is made to describe in great detail the circuit origins of the control signals and timing pulses which bring about the information movement. The discussion that follows explains the invention as it may be incorporated within a data-processing system operating with a plurality of communicating devices as described above in conjunction with FIG. 1.

Figure 3C:
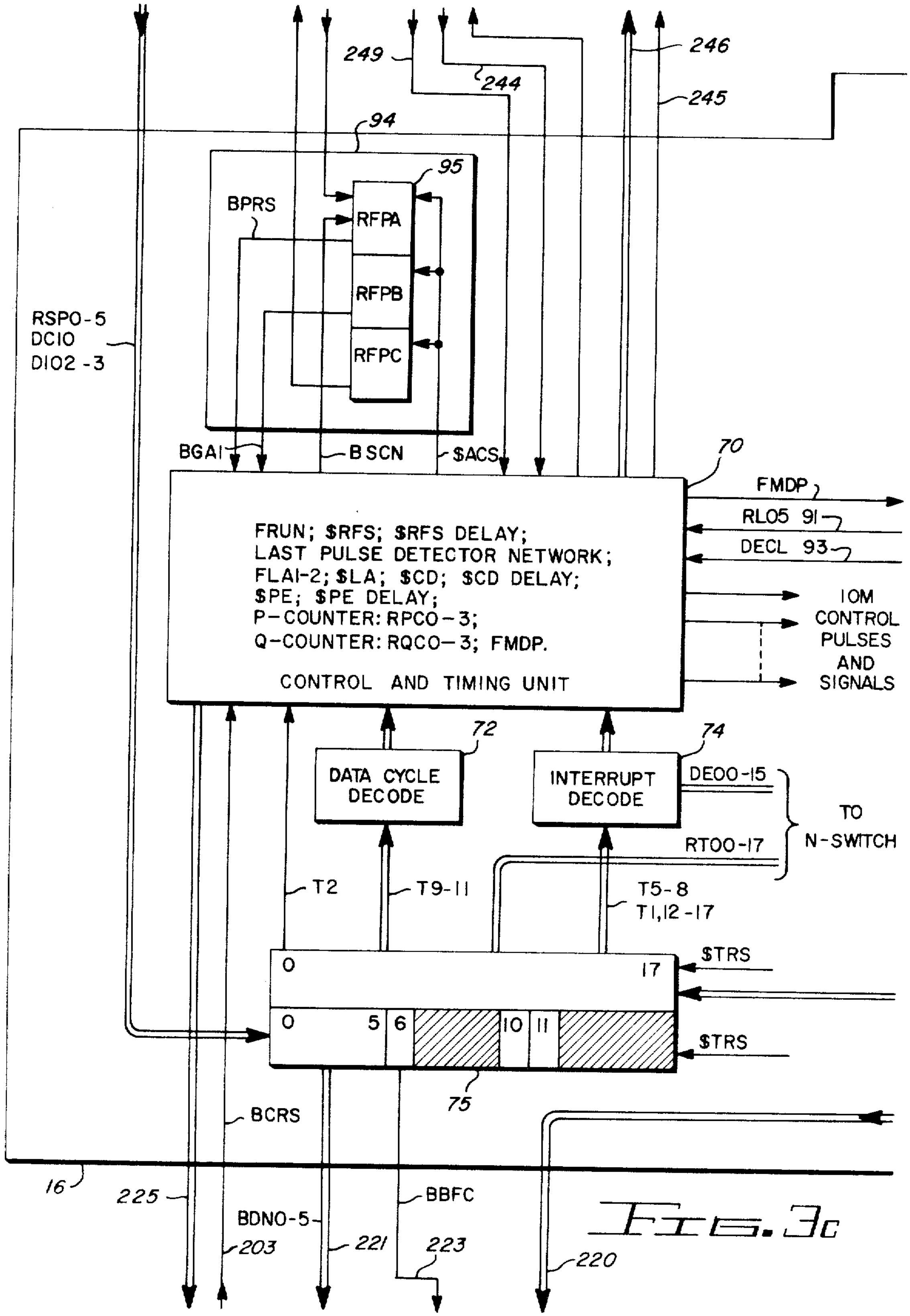
Figure 3D:
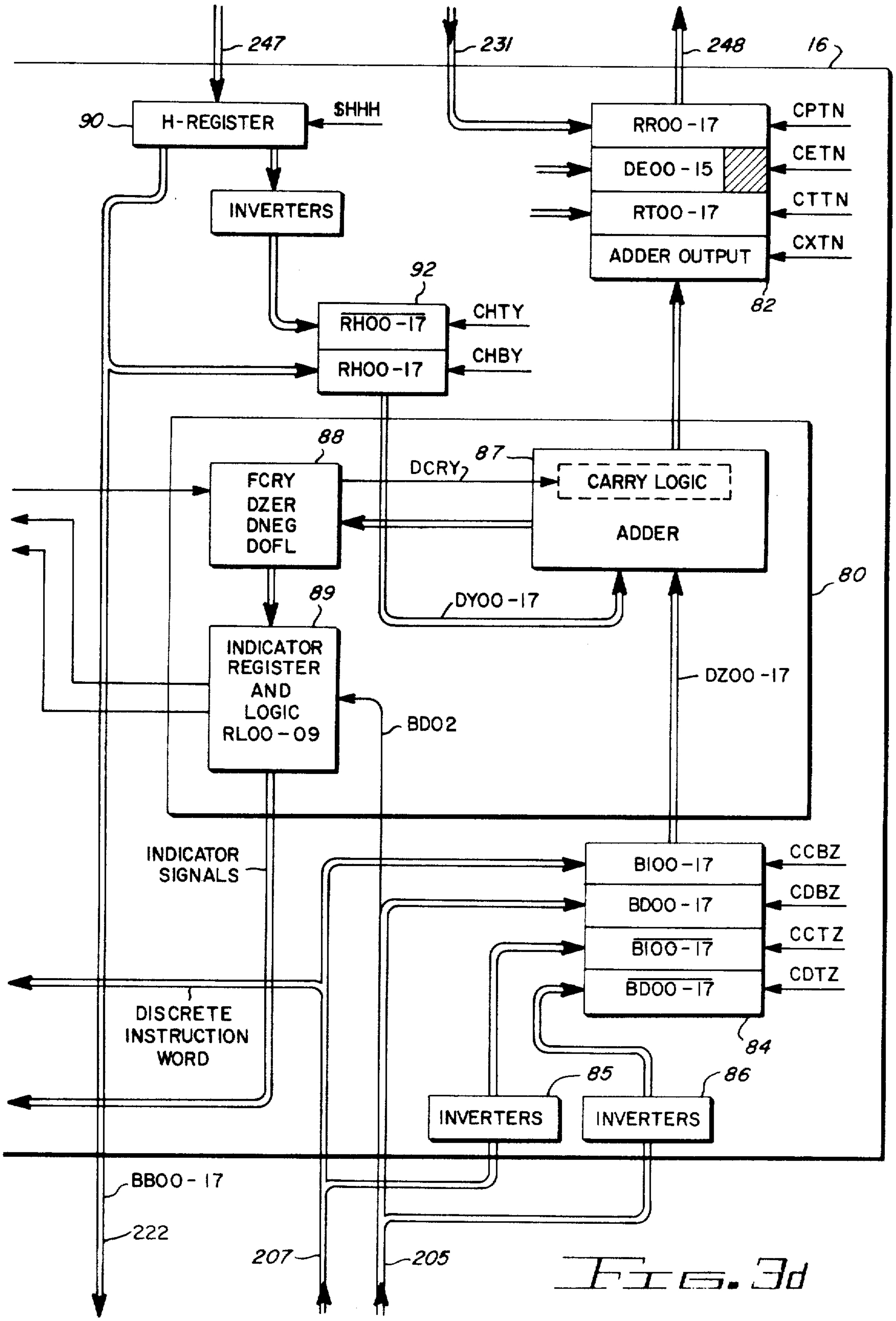
Figure 3E:
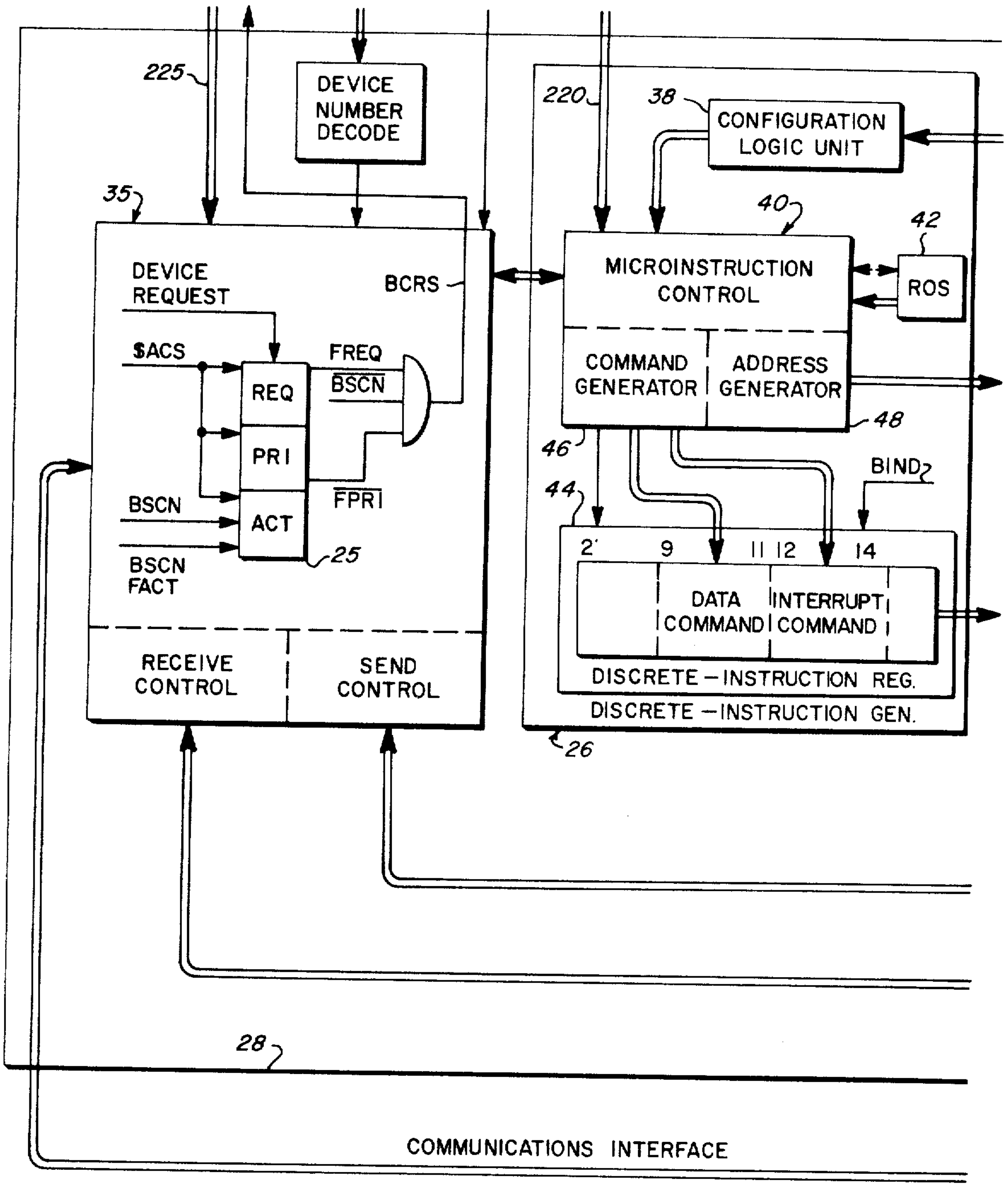
Figure 3F:
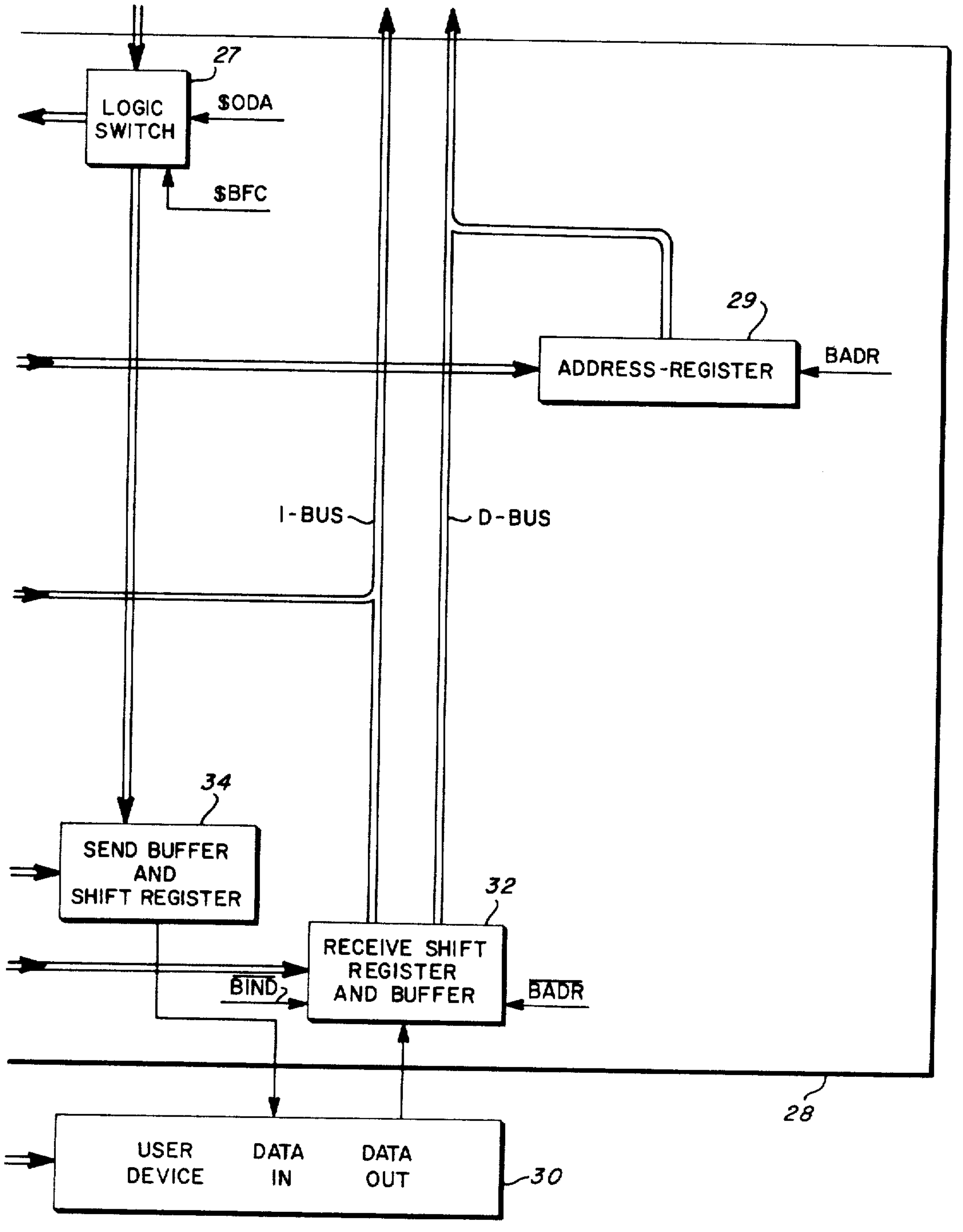

In FIG. 3*a* through 3*f* the system of FIG. 1 is expanded to show a detailed diagram of the system operating with a single representative communicating device. One of the plurality of communicating devices 18 is shown in FIGS. 3*e* and 3*f* comprising the control unit 28 and the user device 30. It is assumed for the purposes of this discussion that the user device 30 is a synchronous data communications modem in communication with a remote multiplexer. A representative message structure and a method by which the present invention may be used for preprocessing the data contained in the message will be explained in another portion of this description. It should be understood that the selection of a modem is purely arbitrary and is not intended to limit the scope of the invention. The diversity of communicating devices 18 that may operate with the present invention is virtually unlimited. They may range from relatively simple devices such as a time-of-day clock or an interval timer; through peripheral equipment such as magnetic disc or drum subsystems; to highly complex control and communications apparatus for servicing the demands of modern science and industry.

Interface Signals

The particular communicating device 18 of FIGS. 3*e* and 3*f* is shown in communication with the IOM 16, on FIGS. 3*c* and 3*d*, via a plurality of signal and data lines which form a part of the common interface bus between the IOM and the plurality of devices. For the purposes of this explanation, however, the IOM 16 is shown in communication with only a single device.

Figure 4:
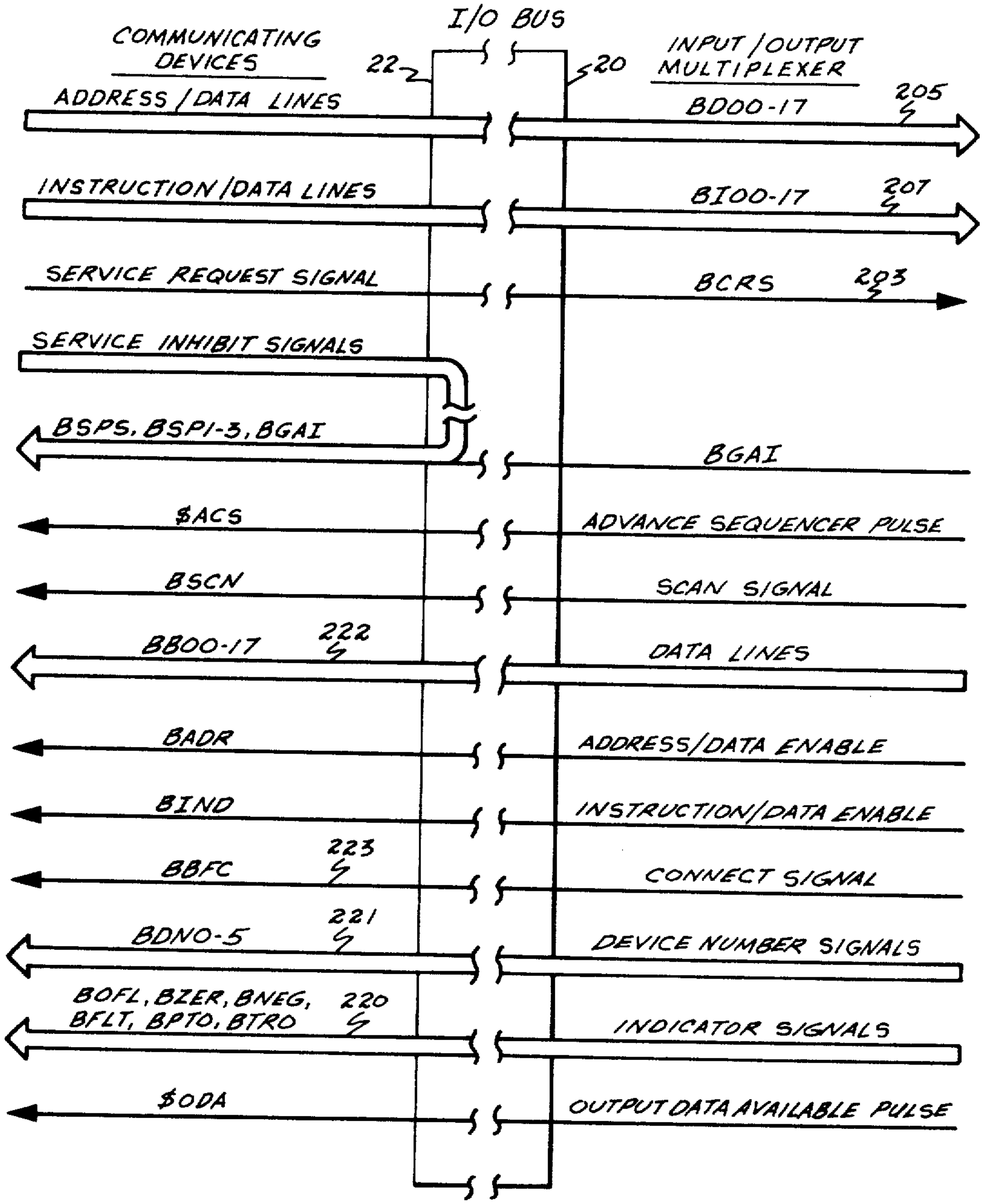
FIG. 4 is a diagram of the interface signals which comprise the common I/O bus between the IOM and each of the communicating devices.

Reference is now made to FIG. 4 for a detailed representation of the signals comprising the main transfer bus 20 and each of the individual device buses 22. Taken as a whole, the signals shown form a part of the common bus, hereinafter referred to as the I/O bus, between the IOM 16 and each of the communicating devices 18. The breaks shown in the signal lines of FIG. 4 are representative of the fact that the signals are common to all communicating devices, although only one set of communicating device lines is shown.

Figure 9:
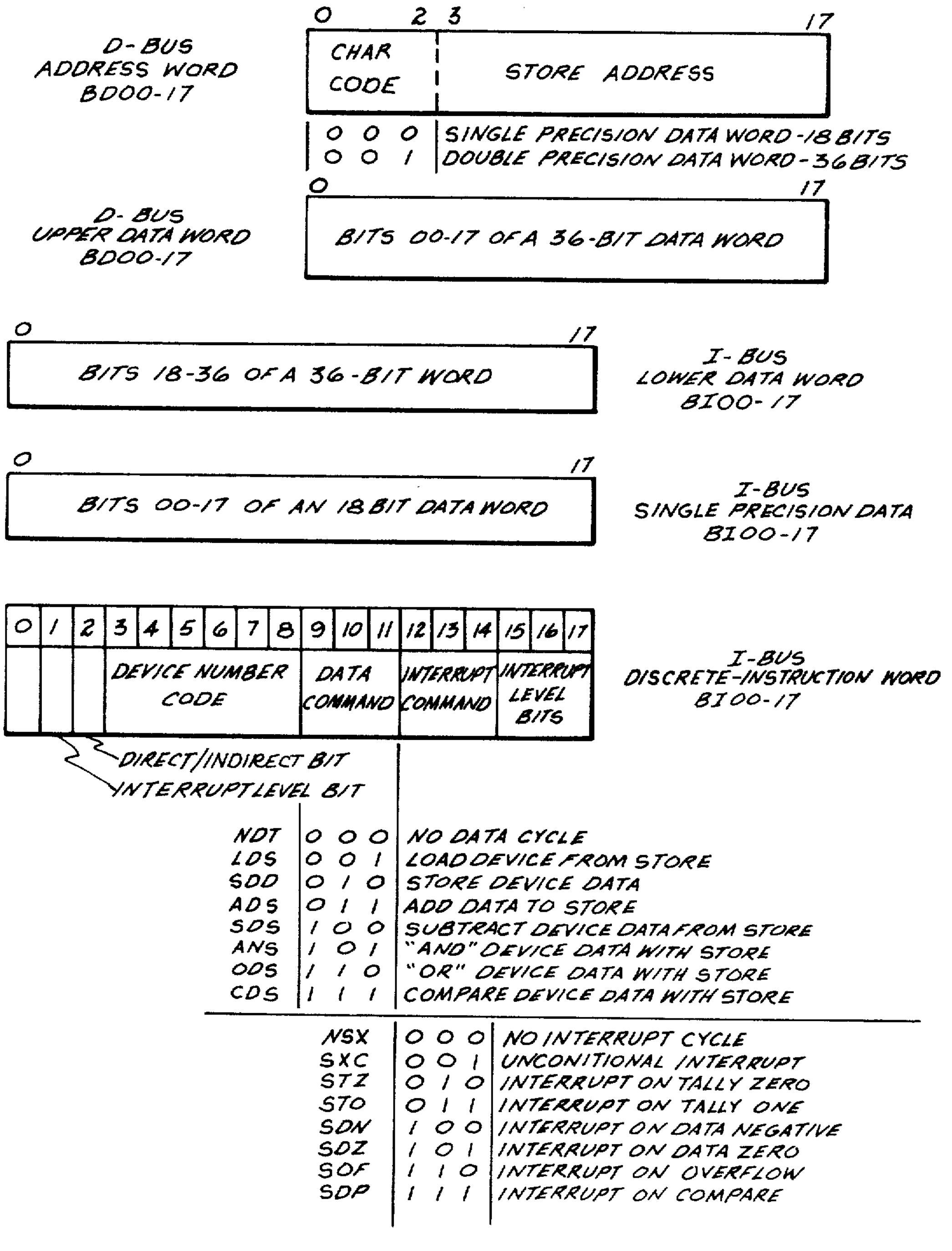
FIG. 9 is a symbolic diagram of the contents of the various data items utilized in the communicating devices and the IOM of the data processing system of FIG. 1.

Returning now to FIG. 3 while continuing to view the signals discussed on FIG. 4, two main transfer buses, a D-bus 205 and an I-bus 207, FIG. 3*d*, transfer information from the communicating device to the IOM 16. Reference may also be made momentarily to FIG. 9 during the following discussion. FIG. 9 shows symbolically the format of the data items on the D-bus 205 and the I-bus 207. When a device has been granted access to the I/O bus, it time-shares the bus by providing both address and data items (FIG. 9, upper part) as signals BDOO–17 on the D-bus 205, and instruction and data items (FIG. 9, lower portion) as signals BIOO–17 on the I-bus 207. The address and instruction data items are sent simultaneously on, respectively, the D-bus 205 and the I-bus 207, followed by data items on the same buses. If the device is capable of double-precision operations, i.e., in this embodiment, 36-bits, the upper data word (FIG. 9, upper portion) comprising bits OO–17 is transmitted over the D-bus 205; the lower data word (FIG. 9, lower portion) comprising bits 18–36, over the I-bus 207. Single precision (18-bit) data items are transferred on the I-bus 207.

A BCRS device service request signal is transmitted to a timing & control unit 70, FIG. 3*c*, of the IOM 16 on a signal line 203. The BCRS signal notifies the IOM 16 that the communicating device 18 is ready to transmit, receive, or alter data, or desires some other service from the IOM. The generation of the BCRS signal is accomplished on FIG. 3*e* and will be explained later. When the request for service is answered and the communicating device is granted access to the IOM, the BCRS signal is disabled by the device.

Data is transmitted from the IOM 16 to the communicating device 18 as signals BBOO–on a data bus 222. When a double-precision transaction takes place, as for example when one or more broad-function commands are transferred to a particular communicating device, the data-lower portion (bits 18–35) is transmitted first, followed by the data-upper (bits 00–17) portion of the 36-bit data item.

The BDNO-5 device number signals are transferred from a T-register 75 of the IOM 16 to all communicating devices 18 on a bus 221. The BDN0-5 signals serve to identify, in this embodiment, the sixty-four channels with which the IOM can communicate. The channel numbers, 0–63, are encoded on these lines.

A BBFC connect signal is transmitted from the T-register 75 of the IOM 16 to the communicating device on a signal line 223. The BBFC signal is transferred from bit position 6 of the T-register 75 and is derived from a DCIO signal placed in the T-register 75 during a broad-function command (BFC) transaction, to be described later. The presence of the BBFC signal on line 223 and a device-number code on bus 221 signal the communicating device corresponding to the particular device-number code that a program connect has been issued and a broad-function command will be presented on the data bus 222 as two 18-bit data items.

Indicator signals are transferred from an arithmetic unit 80 of the IOM 16 to the communicating device on an indicator bus 220. Each of the indicator signals is defined as follows:

BOFL — Overflow Indicator

This signal when enabled indicates that the result of the previous operation (addition or subtraction) performed by the arithmetic unit 80 exceeded the maximum numeric value capability of the arithmetic unit 80.

BNEG — Negative Indicator

When this signal is enabled, the result of the previous arithmetic operation had an absolute value that was negative, or an input data item had an absolute value less than a store-unit data item with which it was compared. During a store device data operation, the BNEG signal is enabled if the absolute value of the input data item is negative.

BZER — Zero Indicator

When the BZER signal is enabled, the result of the previous arithmetic operation was zero, or two data items compared were equal. During a store device data operation, the BZER signal is enabled if the input data item is zero.

BFLT — Fault Indicator

The BFLT signal is enabled when a fault occurred during the previous IOM transaction. Fault conditions may be, for example: the presentation of an illegal instruction by the communicating device; the presentation of a store-unit address by the device, which address is representative of a non-existent location in the store unit; the occurrence of a data parity error; or the presentation of an address by a device, which address resides in a protected region of storage. The processing of fault conditions will not be discussed in this description as it forms no part of this invention.

A group of signals shown on FIG. 4 and not defined in the preceding discussion are transmitted from the control & timing unit 70 of the IOM 16, see FIG. 3*c*, to the communicating devices via a bus 225. The signals are defined as follows:

$ACS — Advance Sequencer Pulse

The $ACS pulse is transferred to a sequencer 25 in a sequence control & timing unit 35 of the device control 28. The communicating device sequencer 25 upon receiving the $ACS pulses from the IOM 16 may advance to one of three control states by enabling one of the corresponding elements, viz: REQ (request access to IOM), PRI (relative priority determination), and ACT (device active). When all three of the control state elements are disabled, the device is inactive with respect to communication with the IOM 16. A device may change state only when the $ACS pulse and a BSCN scan signal are present. The BCRS service request signal is generated in response to the output signals of the communicating device sequencer 25 as shown in FIG. 3*e*, viz: when the REQ element is enabled (FREQ), PRI is disabled, and the BSCN signal from the control & timing unit 70 is disabled ($\overline{BSCN}$).

BSCN — Scan Signal

Enabling the BSCN signal onto the I/O bus is an acknowledgment by the IOM that an access request has been received from a device and that a device will become active when a $ACS pulse is transmitted. The BSCN signal combined with the $ACS signal enables the ACT control state element. A subsequent combination of the BSCN signal and the $ACS pulse notifies the communicating device that the device /IOM transaction is completed, causing the channel to go inactive by disabling the ACT element of the sequencer 25.

BADR — Address/Data Enable Signal

When the BADR signal is enabled onto the I/O bus, the active device is notified that it should enable address information onto the D-bus 205. When the BADR signal is disabled the device is notified that a data item may be placed on bus 205.

BIND — Instruction/Data Enable

When the BIND signal is enabled onto the I/O bus, the active device is notified that command information should be enabled onto the I-bus 207. when the BIND signal is disabled, (i.e., BIND enabled) the device responds by enabling a data item onto the I-bus 207.

The BIND signal is generated in the control & timing unit 70 and transferred via the I/O BUS to the sequence control & timing 35 of the control unit 28. The sequence control & timing 35 may regenerate the BIND signal as received from the IOM 16, or inhibit the regeneration for the purpose of controlling data flow. For example, on FIGS. 3*e* and 3*f*, the BIND signal enables signals from a discrete-instruction register 44 onto the I-bus 207 and the $\overline{BIND}$ signal enables data from a receive shift register & buffer 32 onto the I-bus 207. When the disabled BIND signal ($\overline{BIND}$) is received from the control & timing unit 70, the sequence control & timing 35 in response to signals from a microinstruction control 40 may ignore the $\overline{BIND}$ signal from the IOM 16 and continue generating the BIND signal. Data for transfer to the IOM 16 via the I-bus 207 may thus be supplied by a discrete-instruction generator 26 instead of the receive buffer and shift register 32 during the data portion of the instruction/data transaction cycle. The BADR address/data enable signal, previously described, may be controlled in a similar manner.

$ODA — Output Data Available Pulse

This pulse signals an active device that a data item from the store unit is present on the data lines 222.

Referring now to FIGS. 3*a* through 3*f* taken as a composite figure, the control unit 28 (FIGS. 3*e* and *f*) is shown comprising the discrete-instruction generator 26, a logic switch 27, and an address register 29. Two logic switches, an N-switch 82 (FIG. 3*d*) and a Z-switch 84 are shown in communication with the arithmetic unit 80 in the IOM. Information signals from the user device 30 are transferred through the Z-switch 84 to an adder 87 in the arithmetic unit 80 under control of timing signals generated in a control & timing unit 70.

Since the representative user device employed in this description is a communications modem, the receive shift register & buffer 32 is employed in a manner well known in the art to buffer the data items incoming from the user device 30.

Control signals and timing pulses generated in the control & timing unit 70 also control the transfer of information from the arithmetic unit 80 through the N-switch 82 to the store unit 12 via the system controller 14.

Data items may be transferred from the store unit 12 via the system controller 14 to the arithmetic unit 80 of the IOM through an H-register 90 and a Y-switch 92. Data items from the store unit 12 may also be transferred to the user device 30 through the H-register 90 and the logic switch 27. A send buffer & shift register 34 is employed to buffer the data items destined for the user device 30, which in the embodiment described is a communications modem.

The H-register 90, see FIG. 3*d*, is an 18-bit holding register comprised of bistables RH00–17 which hold all information and data items transferred from the system controller 14 to the IOM 16 via an output data bus 247. Store unit data items are enabled directly into the H-register in response to a control pulse $HHH from the control & timing unit 70. The $HHH pulse is generated by the control & timing unit 70 in response to an indication from the system controller 14 that a store-unit data item is present on the data bus 247. During subsequent data operations the store-unit data item stored in the H-register may be transferred to the arithmetic unit 80 via the Y-switch 92. The H-register signals are enabled through the Y-switch 92 in response to appropriately timed control signals CHBY and CHTY from the control & timing unit 70, the former enabling the RHOO-17; the latter enabling the complement signals, $\overline{RH00\text{-}17}$. The CHBY and CHTY control signals are generated by the control & timing unit 70 in response to specific data operation control state signals.

The Y-switch 92 and the H-register 90 operate under control of timing signals from the control & timing unit 70. The receive shift register & buffer 32, the send buffer & shift register 34, and the logic switch 27 are responsive to timing pulses and control signals from the sequence control & timing unit 35.

The specific function performed by the various logic switching units previously introduced should be pointed out more clearly at this time. The logic switch 27, the Z-switch 84, the N-switch 82, and the Y-switch 92 are switches or switching units comprised of conventional logic elements well known in the art. The switches serve to effect the parallel transfer of selected data items comprising a plurality of data bits, under control of appropriate gating signals generated, as for example, by the control & timing unit 70 of the IOM 16 or the sequence control & timing unit 35 of the control unit 28 and applied to the various logic elements comprising the switching unit. The data items to be selectively propagated through the switch may be transferred to the switch via signal buses from various input units such as registers, arithmetic units, or other switches, and likewise be transferred to another such unit or units in response to appropriately timed control signals. For example, the Z-switch 84 receives data items via the I-bus 207 and the D-bus 205. The data items of the I-bus 207, the BI00–17 signals, and the data items of the D-bus 205, the DB00–17 signals, are selectively transferred through the Z-switch 84 to the adder 87 as the DZ00–17 signals in response, respectively, to appropriately timed control signals CCBZ and CDBZ. The complement of the I-bus and D-bus signals is obtained by passing the signals, respectively, through inverter elements 85 and 86. The complement signals, $\overline{\text{BI00-17}}$ and $\overline{\text{BD00-17}}$ may then be selectively transferred through the Z-switch 84 in response, respectively, to appropriately timed control signals CCTZ and CDTZ. The Z-switch 84 control signals CCBZ, CDBZ, CCTZ and CDTZ, are generated by the control & timing unit 70 at specific times during particular data-transfer and data-altering operations, examples of which will be described in the Data Cycles section of this specification.

The BB00–17 signals on the data lines 222 are transferred through the logic switch 27 to the discrete-instruction generator 26 in response to control pulse $BFC. The $BFC pulse is generated in the sequence control & timing 35 in response to the BBFC signal from the IOM 16, previously defined. The $ODA pulse serves to transfer the BB00-17 signals to the send buffer & shift register 34. The $ODA pulse originates in the control & timing unit 70 of the IOM 16 and is transferred to and regenerated in the sequence control & timing 35 of the control unit 28.

The control & timing unit 70, in addition to providing control signals and timing pulses for internal IOM functions such as the transfer and regulation of data items and signals through the various logic switches, also provides timing pulses and control signals for synchronizing the operations of the IOM with other units throughout the system. The control & timing unit 70 generates signals in response to signals received from other units in the data processing system such as the central processor 10 and the sequence control & timing 35 of the control unit 28. The control & timing unit 70 is responsive as well to signals generated internally within the IOM 16.

The control unit 28 of FIGS. *3e* and *3f* contains the address register 29 which receives signals from the discrete-instruction generator 26. The discrete-instruction generator 26 receives data items from the store unit 12 via the H-register 90 and the logic switch 27. Data items in the form of broad-function commands received by the discrete-instruction generator 26 from the store unit 12 are placed into a configuration logic unit 38. The configuration logic 38 serves to decode the various operation parameters contained in the broad-function command.

The address register 29 holds next-address information generated in the microinstruction control 40. Store-unit addresses held in the address register 29 are transferred via the D-bus 205 as signals BD00-17 to the Z-switch 84 of the IOM 16, when the BADR address/data enable signal is enabled. The BADR signal is generated by the control & timing unit 70 and is logically derived from the outputs of control-state counters to be described later.

The discrete-instruction generator 26, in addition to initiating the generation of the previously mentioned address signals, generates an instruction word. The signals which comprise the instruction word are transferred from the discrete-instruction register 44 via the I-bus 207 to the T-register 75 of the IOM 16 in response to the BIND signal. A $TRS pulse from the control & timing unit 70 places the discrete-instruction word into the T-register 75. The $TRS pulse is generated in response to control & timing unit 70 control state decodes during each discrete-instruction transaction.

The discrete-instruction generator 26 also receives indicator signals from the arithmetic unit 80 of the IOM 16 via the indicator bus 220 into the microinstruction control 40.

Data items comprising the broad-function command are received by the configuration logic unit 38 of the discrete-instruction generator 26 via the logic switch 27. Output data items from the IOM 16 not destined for the discrete-instruction generator 26 are transferred through the logic switch 27 to the user device 30 via the send buffer & shift register 34.

For the purposes of this explanation, the system controller 14 (FIG. *3a* and *3b*) is shown in a simplified manner as a data transfer path intermediate the store unit 12, and both the IOM 16 and the central processor 10. The actual functions performed by the system controller 14 do not, by themselves, form a part of this invention except for those functions related to the interruption of the normal operations of the central processor to effect the generation of a new broad-function command in response to a discrete instruction from one of the plurality communicating devices. For a more detailed description of the interruption function, reference is made to a copending application by A. L. Beard and J. C. Hunter, now U.S. Pat. No. 3,665,415 assigned to the assignee of the present invention.

System controllers are well known in the art. Therefore, the system controller 14 of the embodiment herein described is treated with minimum detail for purposes of simplifying the explanation of the invention. For example, connections for communications between the central processor 10 and the memory 12, through the system controller 14, are represented in FIG. *3a* only by a signal bus 24 connecting the central processor 10 and the system controller 14. Such communication, although ancillary to the present invention, is treated summarily; thus, internal connections and data paths of the system controller 14 requisite to communication between the central processor 10 and the memory 12 are not shown. For a more complete description and details of the operation of a typical system controller, such as the system controller of the present invention, reference is made to U.S. Pat. No. 3,413,613 issued to D. L. Bahrs, et al. on Nov. 26, 1968.

Figure 5:
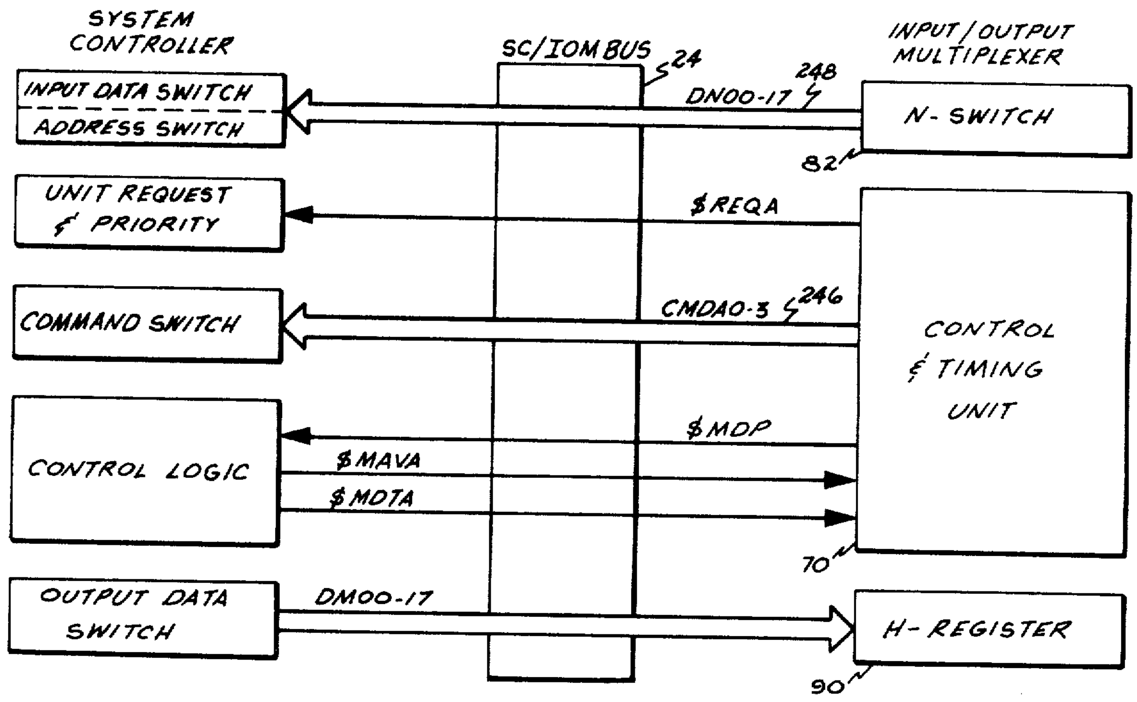
FIG. 5 is a diagram of the interface between the system controller and the IOM.

The major data paths between the store unit 12 and the IOM 16, via the system controller 14, are shown in FIG. *3b*, viz: an output data bus 241 between the store unit 12 and the system controller 14, an input data bus 242, and an address bus 243. Both store unit addresses and data items are transferred from the N-switch 82 (FIG. *3d*) of the IOM 16 to the system controller 14 via a common signal bus 248, hereinafter referred to as the N-bus. The interface signals between the system controller and the IOM are shown in detail in FIG. 5. Similar interface communications signals are shown in FIG. 5 are exchanged also between the system controller 14 and the central processor 10, but they are omitted from FIG. *3a* for clarity. Communication between the system controller 14 and the central processor 10 is effected in an identical manner as is communication between the system controller 14 and the IOM 16. The signals shown in FIG. 5 will be treated more thoroughly in the ensuing discussion pertinent to data-item transactions between the system controller 14 and the IOM 16.

Figure 6:
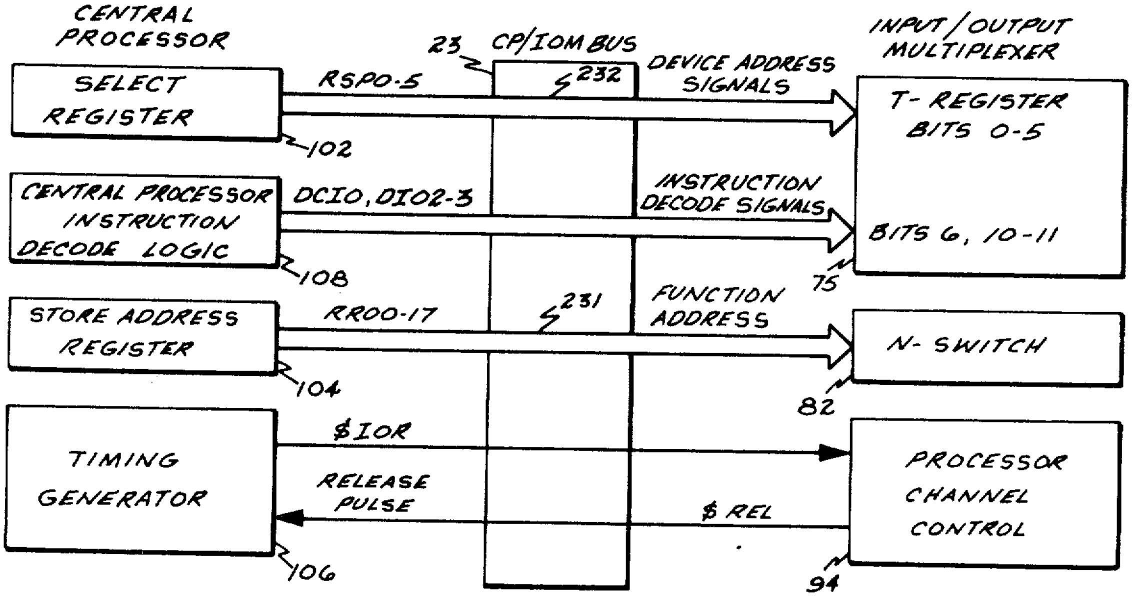
FIG. 6 is a diagram of the interface between the central processor and the IOM.

As previously described, the IOM 16 receives control and timing signals from the central processor 10 via the CP/IOM bus 23. The signal interface is shown in detail in FIG. 6. The source and destination of the interface signals shown in FIG. 6 are discussed next using FIGS. *3a* through *3d*. Signals RR00-17, representative of a function address, are transferred from a store address register 104, FIG. *3a*, to the N-switch 82 in the IOM 16 via the function-address bus 231. The function-address signals are transferred to and gated through the N-switch 82 to an address switch 142 at the appropriate time in response to a control signal CPTN generated in the control-timing unit 70. The CPTN signal is generated in response to control signals requisite to the generation of a broad-function command received from the central processor.

A group of control signals from the central processor 10 which serve to identify a particular one of the plurality of communicating devices are the device address signals RSPO–5. The RSPO–5 signals are stored in a select register 102 of the central processor 10. The RSPO–5 signals are program selected by the central processor 10 either as an initial action of the system supervisory program or in response to an interruption generated by the particular device identified. The RSPO–5 signals, in cooperation with other signals identified below, effect the connection of a particular communicating device to the I/O bus for transferring a broad-function command to the device. The RSPO-5 signals are transferred at the proper time via the CP/IOM bus to the T-register 75 (FIG. *3c*) of the IOM. From the T-register they are subsequently applied to the I/O bus at the BDNO-5 device number signals.

Still referring to FIG. 3 and FIG. 6, two control pulses $IOR and $REL, are transferred via the CP/IOM bus 23 between the central processor 10 and a processor channel control 94 in the IOM 16. The $IOR I/O request pulse and the $REL release pulse control, respectively, the start and termination of a transaction between the central processor 10 and the IOM 16 which transaction serves to transfer a broad-function command (BFC) from the store unit 12 to the device control unit 28. Signals DCIO, DIO2 and D103 which originate in an instruction decode logic 108 of the central processor 10 are transferred respectively via the CP/IOM bus to bit positions 6, 10, and 11 of the T-register 75 in the IOM 16. Signal DIO2 is functional only during data transactions with a static device, and there is not enabled for a BFC transaction. Signal DCIO is enabled during a BFC transaction, and subsequently becomes the BBFC signal on the I/O bus.

In order to achieve meaningful and orderly movements of information and data items among the various registers, units, and other elements of the data processor system, after a need for specific movements and combinations of movements has been established, control signals and timing pulses must be generated or issued to permit the prescribed movements at the desired time. Any undesirable movements must similarly be inhibited. The exact manner in which specific control signals are logically derived and timing pulses are generated from a clock source or a time delay network according to precisely defined conditions within a data processing system at certain precisely defined times has become a matter of common knowledge within the art. Therefore, the discussion that follows explains the invention as it may be incorporated within a data processing system operating with an exemplary communicating device as described above in conjunction with FIG. 3. No attempt is made to describe in detail the circuit origins of the control signals and pulses bringing about the information movement. Strict attention is paid in the ensuing discussion, however, to the sequence of information movement and discrete-instruction generation through which the invention is realized; this is deemed sufficient to teach the invention to those skilled in the art.

BFC Transaction

Figure 7:
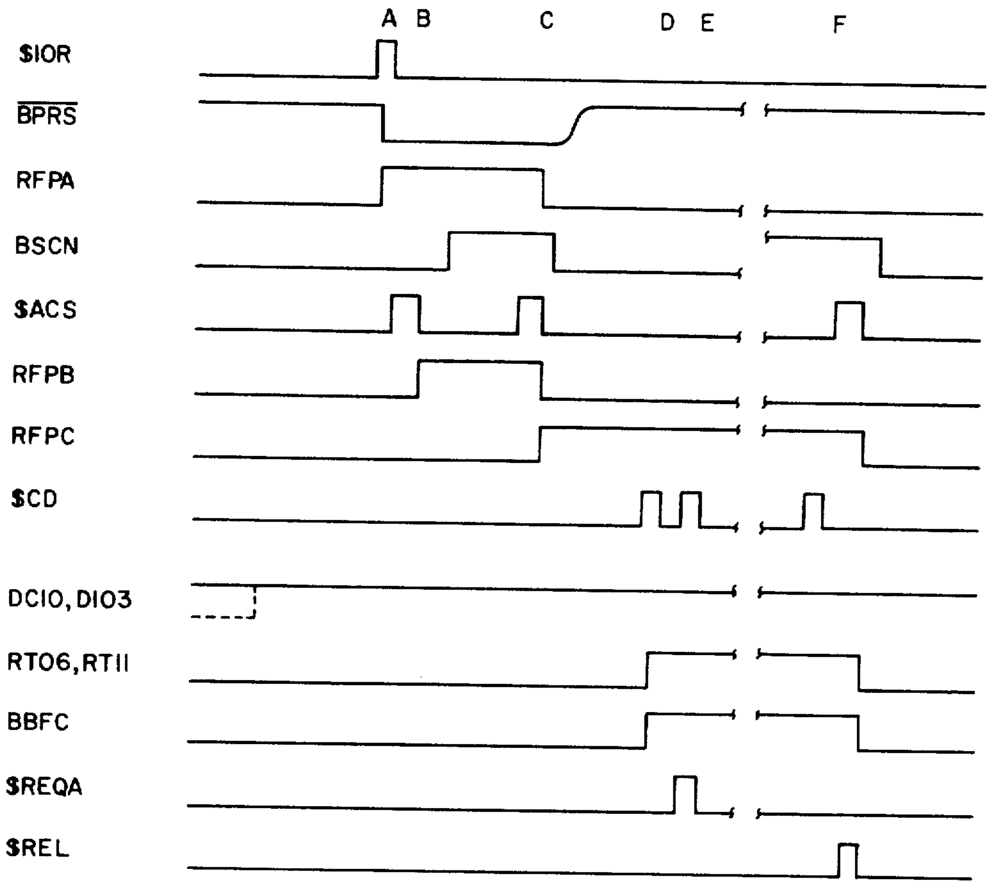
FIG. 7 is a signal timing diagram illustrating the sequence of events which occurs during the transfer of a broad function command to a communicating device.

A BFC transaction is initiated for devices in dynamic operation when the central processor, in response to the system supervisory program, executes a program instruction "connect input-output multiplexer" (CIOM). The CIOM instruction may be issued ab initio by the supervisory program, or in response to the interruption of a program in progress, the interruption having been initiated by one of the communicating devices 18. The timing sequence for a BFC transaction is shown in FIG. 7. During a BFC transaction the IOM 16 accesses a broad-function command from a location in store specified by a store-unit address supplied by the central processor. The BFC is loaded into the IOM H-register 90 sequentially in two parts, each part subsequently being sent to the configuration logic unit 38.

Referring now to FIG. 7 in conjunction with FIG. 3, the sequence of events during the BFC transaction is described as follows:

Step A

The central processor 10 in response to the decode of a CIOM instruction notifies the IOM that it desires a BFC transaction by generating the $IOR pulse in a timing generator 106 of the central processor 10. The $IOR pulse is transferred to a sequencer 95 (FIG. *3c*)

in a processor channel control 94. The processor channel control 94 functions to allow the IOM to treat the central processor as a communicating device. The sequencer 95 is comprised of three bistables: RFPA, RFPB, and RFPC. The RFPA bistable is enabled when a request for service has been received from a central processor. The RFPB bistable is enabled when the processor channel 94 has priority for the next cycle. The RFPC bistable is enabled when the processor's request is being serviced by the IOM. The sequencer 95 functions in a similar manner as sequencers in each of the communicating devices, as for example, the sequencer 25 in the sequence control & timing unit 35 of the representative communicating device control unit 28. The sequencers 25 and 95 obey the same general signal sequencing rules to proceed from an idle into an active state. The RFP bistables of the processor channel sequencer 95 correspond to the REQ, PRI, and ACT elements of the communicating device sequencer 25. For a more detailed description of the communicating device sequencer 25 reference is made to a copending application Ser. No. 108,276 filed concurrently with the present application by James S. Houser and John C. Hunter, which copending application is assigned to the same assignee as the present invention.

When the RFPA bistable is enabled and the BSCN scan signal is disabled, the processor channel BPRS request signal is enabled (BPRS is forced to logical "0"). The processor channel control 94 is not connected to the I/O bus as are the communicating devices. The BPRS signal functions for the processor channel as does the BCRS signal on the I/O bus for each of the plurality of communicating devices. When the BPRS signal is enabled, the IOM begins a start-up sequence as it does when a device on the I/O bus requests service.

Step B

An advance sequencer $ACS pulse is generated by the control & timing unit 70 in response to the enabling of the BPRS signal. The $ACS pulse advances the processor channel control 94 to the priority checking stage by enabling the RFPB bistable, thereby inhibiting all communicating devices on the I/O bus as previously described. The processor channel control 94, acting as a communicating device, thus allows the central processor to capture the next IOM sequence for executing a BFC transaction. The BSCN scan signal is generated by the control & timing unit 70 after an internally generated delay which is sufficient to allow the processor channel control 94 to act upon the $ACS pulse.

Step C

The IOM control & timing unit 70 generates a second $ACS pulse as a function of the I/O start-up sequence. The processor channel control 94 responds to the second $ACS pulse by enabling the RFPC bistable thus entering the active state. The RFPA and RFPB bistables are disabled at this time to disable, respectively, the BPRS service request signal and the BGAI signal.

Step D

A $CD pulse generated internally within the control & timing unit 70 during the IOM start-up sequence (see IOM Start-Up from Idle State description), is used to generate a $TRS pulse. During the BFC transaction, the $TRS pulse serves to gate the signals from the instruction decode logic 108 (FIG. 3*a*) and RSPO-5 device-address signals from the select register 102, which signals are present on the CP/IOM bus 23, into the T-register 75. For the BFC transaction the DCIO signal is stored in bit position 6, RTO6, of the T-register 75 and is subsequently enabled onto the I/O bus as the BBFC connect signal. The DIO3 signal is stored in the T-register 76 as RT11, to subsequently force the decode of a load cycle in a data cycle decode 72. The RSPO-5 device-address signals are stored in bit positions 0-5 of the T-register. The $CD pulse also causes the control & timing unit 70 to advance to its next sequential state. The $CD pulse is passed through an internal delay network (not shown) in the control & timing unit 70 and regenerated as a delayed $CD pulse.

Step E

A $REQA pulse is generated in response to the delayed $CD pulse and transferred to the system controller 14 on a signal line 245 to request a double precision (36-bit) load cycle. Concurrently, the RR00-17 address signals are transferred from the store address register 104 in the central processor 10 through the N-switch 82 to the system controller 14 via the N-bus 248. The CPTN signal directed to the N-switch 82 is generated in the control & timing unit 70 in response to the delayed $CD pulse. The CPTN signal gates the RR00-17 signals from the store address register 104 of the processor 10 to the system controller 14.

The BFC transaction continues as a normal load cycle, a typical data-cycle transaction, for a communicating device. Data cycles will be described later. The load cycle is shown as a break in the timing cycle in FIG. 7. The BFC transaction then continues.

Step F

When the broad-function command comprising two 18-bit data items has been accessed from store and sent to the communicating device, the IOM begins the cycle termination. The BSCN scan signal, the final $ACS pulse generated in the control & timing unit 70, and the RFPC signal combine to enable a $REL pulse. The BSCN signal is enabled during the load cycle sequence. The $REL pulse is transferred via the CP/IOM bus 23 to the timing generator 106 where it serves to release the processing unit 101 of the central processor 10 from the BFC transaction cycle. During the period from the generation of the $IOR pulse to the generation of the $REL pulse, the central processor 10 is unable to perform any other operation.

IOM Start-Up From Idle State

Figure 8:
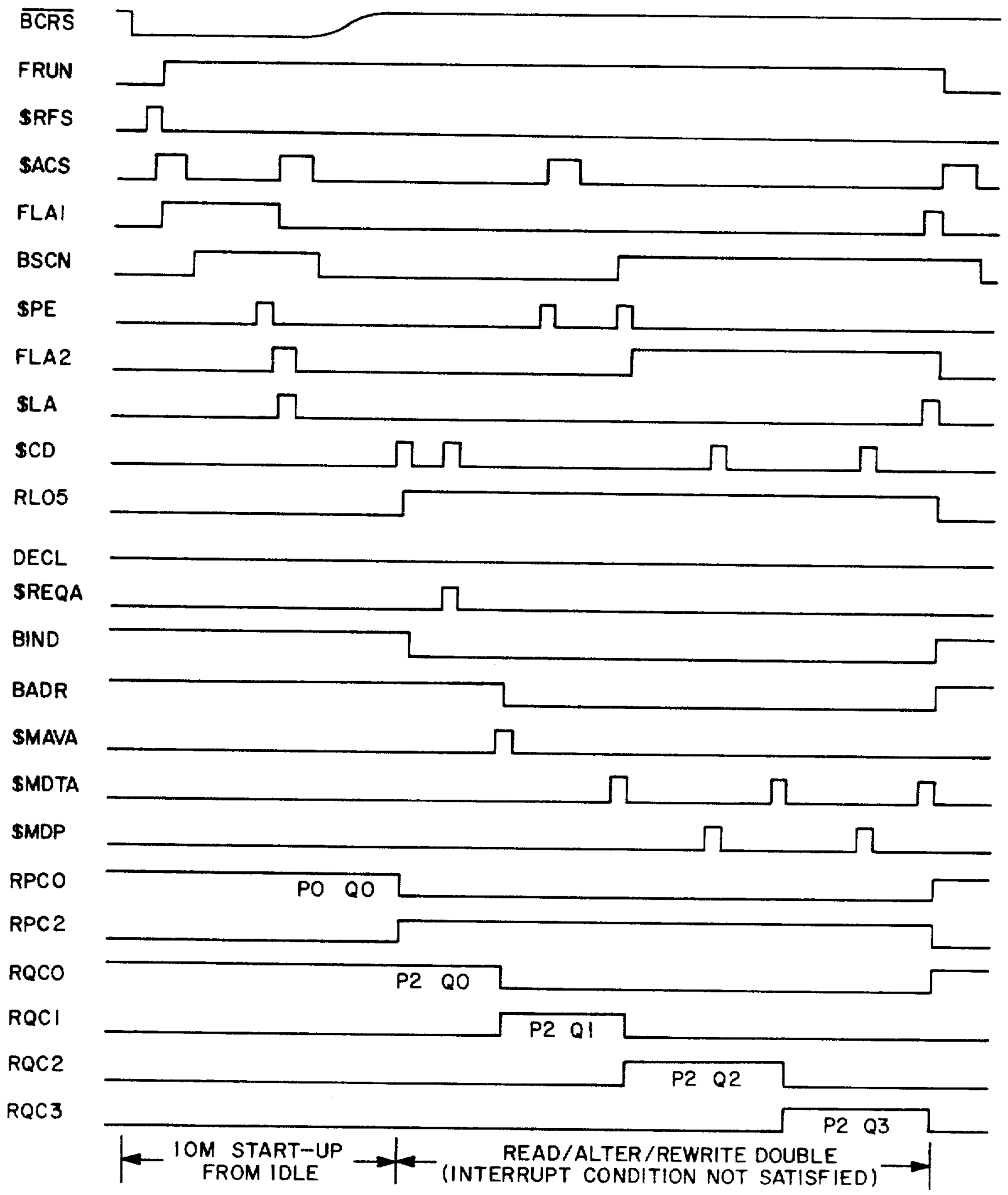
FIG. 8 is a signal timing diagram of an IOM transaction including the IOM start-up from an idle state and a double-precision data transaction cycle with no interrupt.

A BCRS service request signal notifies the IOM that a communicating device requires service, such as a transfer of data. The BCRS signal is transferred via the I/O bus on the signal line 203 to the control & timing unit 70 of the IOM. FIG. 8 shows the signal timing sequence for the IOM start-up.

Referring now to FIG. 8 in conjunction with the composite FIG. 3, an internal control bistable, FRUN, in the control & timing unit 70 (FIG. 3*c*) is disabled when the IOM is idle. When the BCRS signal is enabled on the I/O bus, the control & timing unit 70 generates an internal pulse, $RFS, to indicate that a request for service from a communicating device has been detected. The $RFS pulse initiates the following events within the control & timing unit 70:

the FRUN bistable is enabled, the $ACS pulse is generated to advance the communicating device sequencer,
the BSCN scan signal is enabled, and
the $RFS pulse is delayed and used to generate a new pulse, $PE.

The delay is sufficient to allow the priority network of the communicating devices to settle so that the devices can determine their priority for the cycle.

The $RFS pulse enables a bistable FLA1. The FLA1 bistable forms the first half of a last pulse detector network in the control & timing unit 70. The IOM 16 is capable of performing transactions of varying complexity and length involving pulse exchanges with the system controller, the active communicating device, and the central processor. Consequently, the last pulse detector network is required to determine the end of a particular I/O transaction. The last pulse detector comprises two bistables, FLA1 and FLA2, and a pulse shaper. If bistable FLA2 is enabled and a pulse disables bistable FLA1, the negative going transition of the FLA1 signal triggers the pulse shaper and a $LA pulse is generated. The inputs to the FLA bistables are the logical OR's of the first and last pulses of the various I/O transaction cycles.

When the $RFS pulse emerges from the delay network as the $PE pulse, the FLA2 bistable is enabled. The FLA2 signal is used during the IOM start-up sequence as a reset pulse for the FLA1 bistable. When the FLA1 bistable resets, the $LA pulse is generated. The $LA pulse functions to reset all major control elements in the IOM to ensure that no controls are in the wrong state as the cycle begins. The $LA pulse is also applied to a delay network to be regenerated as a $CD pulse. The function of the $CD pulse will be explained in the subsequent description of an IOM transaction request.

The disabling of the BSCN signal is delayed for a short time period following the generation of the $LA pulse to allow time for communicating devices on the I/O bus to respond to a second $ACS pulse. The second $ACS pulse is generated in response to the $LA pulse and enabled onto the I/O bus to advance the highest priority communicating-device sequencer to the active state. A particular communicating device will become active when: the $ACS pulse is generated, the BSCN signal is enabled, and the device has the highest priority.

If a communicating device desiring service does not have the highest priority it must wait until the next $ACS BSCN combination before access may be gained to the IOM bus. Upon becoming active, a communicating device disables its BCRS signal in response to the $ACS pulse. If another channel requests service by enabling its BCRS signal onto the I/O bus, the IOM will ignore the request until the end of the cycle in progress.

Device Active to IOM Transaction Request

When the highest priority communicating device becomes active at $ACS BSCN time, it must place a discrete-instruction word on the I-bus 207 and an 18-bit address word on the D-bus 205 (assuming it is a dynamic device). A discrete-instruction word is enabled onto the I-bus 207 from the discrete-instruction register 44 in response to the BIND signal generated in the control & timing unit 70. An address word is enabled onto the D-bus 205 from the address register 29 in response to the BADR signal generated in the control & timing unit 70. The $LA pulse generated during the IOM start-up sequence is delayed sufficiently to allow the discrete-instruction and address information on the I/O bus to settle. Subsequent to the delay, the $LA pulse is regenerated as the $CD pulse. A $TRS pulse generated in the control & timing unit 70 in response to the $CD pulse transfers the entire data item comprising the discrete-instruction from the I-bus 207 into the T-register 75. The IOM subsequently decodes the command information contained in the discrete-instruction word and proceeds to the proper state as dictated by the commands. The discrete-instruction word format is shown in FIG. 9. Referring to the lower portion of FIG. 9, there is shown the discrete-instruction word comprising several fields including two command fields, a data command field and an interrupt command field. The information contained in two command fields is generated in a command generator 46 of the micro-instruction control 40 and transferred to the discrete-instruction register 44 in a manner described in another section of this description (see FIG. *3e*). The command information is transferred via the I-bus 207 into the T-register 75 (FIG. *3c*) as the RTO9–14 signals. The data command comprising signals RTO9–11 is decoded in the data cycle decode 72; the interrupt command comprising signals RT12–14, in an interrupt decode 74.

Referring again to FIG. 8, and continuing the IOM cycle, the first $CD pulse generated in response to the (delayed) $LA pulse of the IOM start-up sequence also places the IOM 16 into the proper state to begin an IOM transaction cycle. The primary sequence control signals for the IOM are generated from decodes of a P-counter and a Q-counter in the control & timing unit 70. The P-counter generates signals RPCO-3 and specifies the type of cycle being executed. The Q-counter generates signals RQCO–3 and controls the progress of the cycle.

The P-counter specifies the major cycle being formed by the IOM by enabling one of four signals, RPCO–3. Only one of the signals can be enabled at any time.

The Q-counter likewise generates four signals, RQCO–3, which are used by the IOM to control the progress of the major cycle specified by the P-counter. Only one of the four Q-counter signals may be enabled at any one time. The Q-counter changes state (i.e., enables a different signal) when the control & timing unit 70 (FIG. *3b*) receives a pulse from the memory controller 14. The control states of the IOM 16 as specified by the P-counter and Q-counter signals are as follows:

RPCO — The IOM is inactive, waiting for a service request from one of the communicating devices 18 or the central processor 10.

RPC1 — In the RPC1 state the IOM is servicing a communicating device utilizing indirect addressing, and is in the process of updating an indirect control word (ICW).

RPC2 — When the RPC2 signal is enabled (P2 state) the IOM transfers data items to or from the store unit 12 via the system controller 14, performing any data operation prescribed by the data command portion of a discrete-instruction word. The transfer of a BFC data item from the store unit to one of the communicating devices is also accomplished when the IOM 16 is in the P2 state.

RPC3 — In the P3 state the IOM initiates a Set Interrupt Cell transaction in response to the execution of the interrupt command portion of a discrete instruction from one of the communicating devices 18.

RQCO — The IOM 16 is inactive. When the RPCO signal is disabled and another major control state such as the P2 state is entered by enabling the RPC2 signal, the IOM has started a new transaction cycle. The RQC0 signal, however, remains disabled (P2 Q0) until the first pulse is generated by the system controller 14 and received by the IOM 16 during the interchange of synchronizing pulses and signals that transpires during the new cycle. During the Q0 portion of the new cycle, the $REQA store-unit request pulse, the discrete-instruction decodes, and the store-unit address are transferred from the IOM 16 to the system controller 14. The Q0 state may therefore be termed the address portion of a store-unit address/data cycle.

RQC1 — In the Q1 state the IOM has requested a store-unit cycle from the system controller 14 and has received an acknowledging signal, pulse $MAVA. The Q1 state is the data portion of a store-unit address/data cycle. The $MAVA pulse indicates to the IOM 16 that its request for service has been received and the IOM may proceed with the prescribed store-unit cycle. During the Q1 state, a data item is sent to or retrieved from the store unit.

RQC2 — An arithmetic operation (if prescribed by the discrete instruction) takes place during the Q2 state. The Q2 state (RQC2 enabled) is entered in response to a first $MDT pulse transferred from the system controller 14 to the control & timing unit 70 of the IOM 16. The $MDTA pulse notifies the IOM 16 that a data-item is available on the data lines 247 of the SC/IOM bus, or that a data-item sent to the system controller 14 via the N-bus 248 has been received by the system controller.

RQC3 — The Q3 state is a major cycle termination state. To enter the Q3 state, the IOM 16 receives the second $MDT pulse of the cycle in progress from the system controller 14. The major cycle (as indicated by the state of the P-counter) will terminate after the Q3 state. The Q3 state is essentially identical to the Q2 state; a second store-unit cycle is performed, as for example during a double-precision operation.

For the purposes of this discussion the control state of the IOM at any given time will be referred to in an abbreviated manner by stating which of the P and Q-counter signals are enabled, e.g., P0 Q0 indicates that the RPC0 and RQC0 signals are enabled and the IOM is inactive.

As previously stated, the exact manner in which these specific control signals and pulses are generated according to precisely defined conditions within the data processing system at certain precisely defined times is a matter of common knowledge within the art. The ensuing discussion, therefore, does not describe in detail the circuit origins of the logic signals and pulses which result in the movement of specific information items at specified times within the system.

Continuing on FIG. 8, the first $CD pulse is used to generate another $CD pulse by circulating the $CD in a $CD delay network. The delay is determined by the type of cycle to be performed.

When the second $CD pulse emerges from the delay network, the control & timing unit 70 generates a $REQA store-unit request pulse to notify the system controller that the IOM wishes to perform a store-unit cycle. Concurrently with the $REQA pulse, the store address on the D-bus 205 is passed unaltered through the adder 87 to the system controller 14 in response to control signals CDBZ and CXTN. The CDBZ and CXTN control signals are generated in the control & timing unit 70 during the Q0 portion of an IOM transaction cycle in response to the RQCO Q-counter output signal. The format of the store-unit address word is shown in FIG. 9.

Referring to the upper portion of FIG. 9, there is shown an address word comprised of signals BD00-17 including a 3-bit character code field and a 15-bit store address field. If the enabled device is a direct, 36-bit word device, an address generator 48 in the micro-instruction control 40 (see FIG. 3*e*) enables bit 2 (BD02) of the character code field. A single-precision (18-bit) device disables bit 2 of the character code field as shown in FIG. 9 by representative 0 and 1 bistable states of the D-bus Address Word bits. An indicator register and logic 89 (FIG. 3*d*) in the arithmetic unit 80 includes a single/double precision indicator, bistable RL05. The RL05 bistable is enabled if the BDO2 address line is enabled at the first $CD time. The RL05 signal is transferred to the control & timing unit 70 via signal line 91.

A communicating device with the ability to maintain the storage location address, character position, and count of its data transactions (i.e., a direct device) specifies the direct addressing mode to the IOM. This type of communicating device specifies the direct mode by enabling bit 2 of the discrete-instruction register 44. The discrete-instruction word shown symbolically in the lower portion of FIG. 9 includes the three fields examined by the IOM during the interval from the generation of the first $CD pulse to the generation of the second $CD pulse, viz: the direct/indirect bit, the data command field, and the interrupt command field. If signal RT02 (T2) from the T-register 75 is enabled at the first $CD time (i.e., direct addressing), and if a data command is present as indicated by the decode of a data command in the data cycle decode 72, the P-counter in the control & timing unit 70 is advanced to the data-cycle or P2 state as shown in the FIG. 8 timing diagram. Had the T2 signal been disabled and a data command present, the P-counter would have advanced to the P1 state (indirect addressing). Indirect addressing utilizing an indirect control word or the like from the system store unit is a technique well known in the art and will not be discussed here.

The interrupt command signals, bits 12–14 of the discrete-instruction word are sensed in an interrupt decode 74. If the data cycle decode 72 senses no data cycle (NDT) from the data command field of the discrete-instruction word, and the interrupt decode 74 senses an unconditional interrupt (SXC) from the interrupt command field, the P-counter is advanced initially to the P3 state, viz: an interrupt cycle. In the latter case, the condition of the direct/indirect bit (T2) is disregarded.

During the delay time between the first and second $CD pulses, the states of the P-counter and the Q-counter, the RL05 signal, and the T-register 75 (FIG. 3*c*) are examined and decoded. In response to signals from the data cycle decode 72, the interrupt decode 74, or both decodes 72 and 74 as determined by the particular command signals, the control & timing unit 70 generates signals CMDA0–3 which signals are transferred to the system controller 14 (see FIG. 3*a*) via a bus 246. The CMDA0–3 signals are representative of a store-unit cycle command. The following table shows the various store-unit cycle commands encoded and transferred to the system controller 14 as signals CMDA0–3, in response to signals comprising a discrete-instruction and a single/double precision indicator transferred from a communicating device to the IOM 16:

| Discrete-Instruction Bits 9 | 10 | 11 | Cycle Length RLO5 | Signals to System Controller CMDA0-3 0 | 1 | 2 | 3 | Store Unit Cycle |
|---|---|---|---|---|---|---|---|---|
| 0 | 0 | 1 | 0 | 0 | 0 | 0 | 0 | Read/Restore Single |
| 0 | 0 | 1 | 1 | 0 | 0 | 0 | 1 | Read/Restore Double |
| 0 | 1 | 0 | 0 | 0 | 1 | 1 | 0 | Clear/Write Single |
| 0 | 1 | 0 | 1 | 0 | 1 | 1 | 1 | Clear/Write Double |
| 0 | 1 | 1 | 0 | 0 | 1 | 0 | 0 | Read/Alter/Rewrite Single |
| 1 | 0 | 0 | 0 | 0 | 1 | 0 | 0 | Read/Alter/Rewrite Single |
| 1 | 0 | 1 | 0 | 0 | 1 | 0 | 0 | Read/Alter/Rewrite Single |
| 1 | 1 | 0 | 0 | 0 | 1 | 0 | 0 | Read/Alter/Rewrite Single |
| 1 | 1 | 1 | 0 | 0 | 0 | 0 | 0 | Read/Restore Single |
| 0 | 1 | 1 | 1 | 0 | 1 | 0 | 1 | Read/Alter/Rewrite Double |
| 1 | 0 | 0 | 1 | 0 | 1 | 0 | 1 | Read/Alter/Rewrite Double |
| 1 | 0 | 1 | • | 0 | 1 | 0 | 1 | Read/Alter/Rewrite Double |
| 1 | 1 | 0 | 11 1 | 0 | 1 | 0 | 1 | Read/Alter/Rewrite Double |
| 1 | 1 | 1 | 1 | 0 | 0 | 0 | 1 | Read/Restore Double |
| 0 | 0 | 0 | SXC | 1 | 0 | 0 | 0 | Set Interrupt Cell |
| Indirect Cycle: T2 = 0 | | | | 0 | 1 | 0 | 1 | Read/Alter/Rewrite Double |

Still referring to the timing diagram of FIG. 8, following the transfer of the $REQA pulse, the CMDA0-3 store unit cycle command signals, and the store-address signals to the system controller 14, the system controller responds with a $MAVA pulse acknowledging the request and the receipt of the command and address signals. The $MAVA pulse is generated in a control logic 140 of the system controller 14 and is transmitted to the control & timing unit 70 of the IOM 16 via control line 244. The $MAVA pulse notifies the IOM the IOM the address portion of the store-unit cycle is completed and the store unit is available for a data transaction. The active control unit 28 is normally responsive (if a 36-bit device) to the BADR signal to remove the address signals from the D-bus 205 and to enable the upper 18 bits of data onto the D-bus The BADR signal is disabled ($\overline{\text{BADR}}$ enabled) by the control & timing with 70 in response to the $MAVA pulse from the system controller 14. The $\overline{\text{BADR}}$ signal is enabled onto the I/O bus as an indication to the active communicating device that the system controller 14 has utilized the address signals presented thereto via the D-bus 205 and the N-bus 248.

After requesting service from the system controller, the IOM remains in state P2 Q0 until the system controller acknowledges the request by generating the $MAVA pulse. The $MAVA pulse causes the IOM to advance to state P2 Q1. The control & timing with 70 delays the $MAVA pulse in the $PE delay network. When the $PE pulse is generated after the receipt and delay of the $MAVA pulse, the control & timing unit 70 generates another $ACS signal and recirculates the $PE pulse in the delay networks to be used at a later time. The $ACS pulse is transferred to the devices on the I/O bus just prior to enabling the BSCN signal. This $ACS pulse advances sequencers of the inactive devices to the priority checking state to prepare for the activation of the highest-priority channel at the completion of the cycle in progress.

When the delayed $PE pulse emerges from the delay network ($MAVA delayed), the last-pulse detector bistable FLA2 is enabled. Enabling FLA2 conditions the last-pulse detector network for the generation of the $LA pulse upon completion of the IOM data cycle in progress.

The sequence of events that occurs during the period from the enabling of the $REQA store-unit request pulse to the termination of the IOM transaction cycle when the final $ACS advance sequencer pulse is enabled depends upon the type of cycle being performed. The differences in the various data-cycle transactions will be pointed out in the ensuing discussion.

Data Cycles

Figure 10:
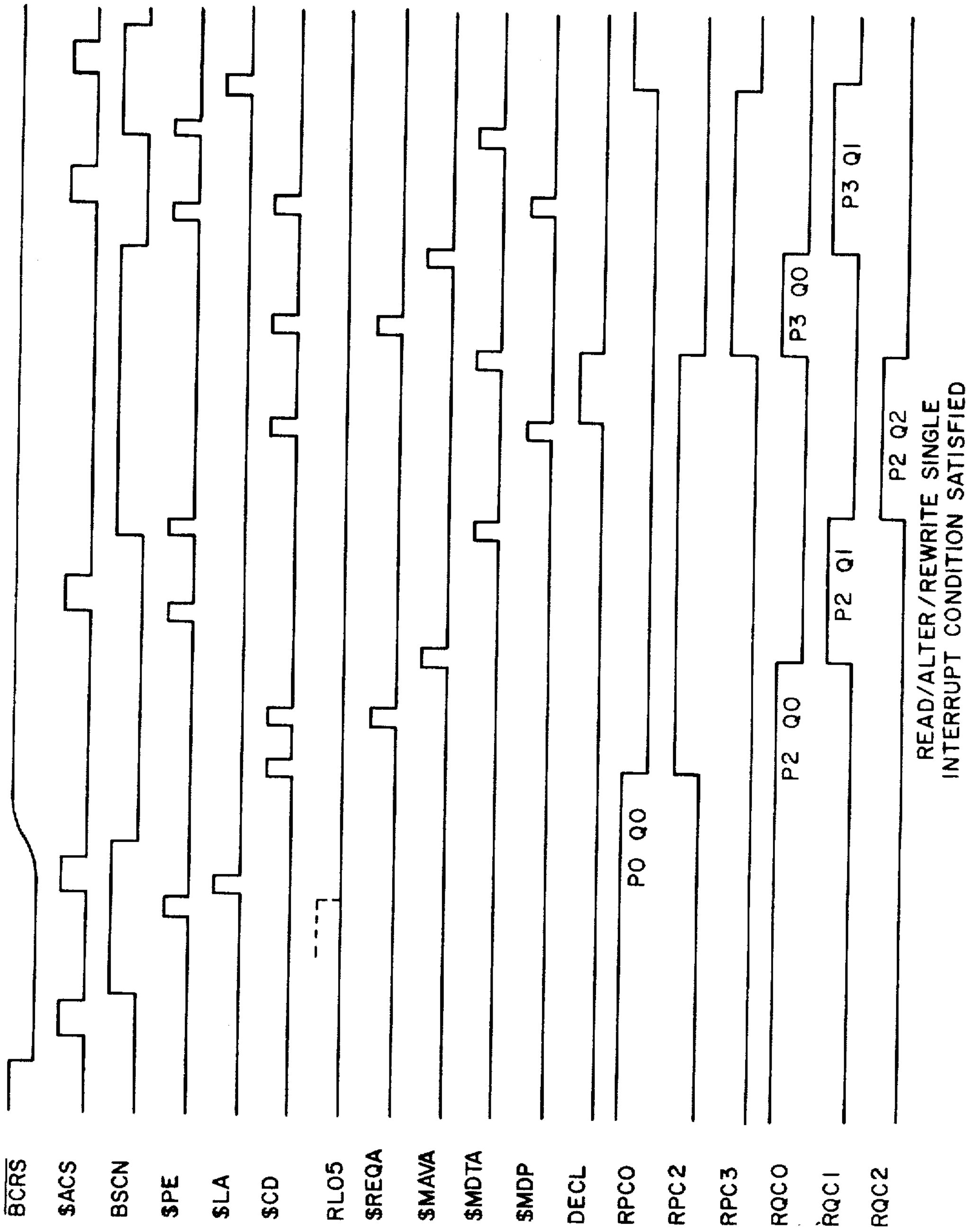
FIG. 10 is a signal timing diagram of a single-precision data transaction cycle with an interrupt condition satisfied.

The timing diagrams for two representative data-cycle transactions are shown in FIGS. 8 and 10. FIG. 8 is a timing diagram for a read/alter/rewrite double data-cycle transaction during which the interrupt condition specified by the interrupt command portion of the discrete instruction word is not satisfied. FIG. 10 is a timing diagram of a read/alter/rewrite single data-cycle transaction during which the interrupt condition is satisfied. The read/alter/rewrite cycle encompasses those cycles which perform data-altering operations.

For — general discussion of data cycles, reference is made to FIG. 3 in conjunction with the timing diagram of FIG. 8. The data cycle transaction as specified by the data command-portion of discrete instructions generated by the communicating devices 18 are executed in the arithmetic unit 80 (FIG. 3*d*) of the IOM 16. The arithmetic unit 80 utilizes the 18-bit parallel adder 87 for altering data. The arithmetic unit 80 comprises the adder 87 including look-ahead carry logic, a data check logic unit 88, and the indicator register and logic 89. Control signals which determine the function the adder is to perform originate in the control & timing unit 70 and are logically derived from the major control state counter (P-counter), the control state progress counter (Q-counter), and the decodes of the T-register 75 (FIG. 3*c*). The functions performed by the adder include: finding the sum of two numbers, logically ANDing two numbers, logically ORing two numbers, and comparing the absolute value of two numbers. Referring momentarily to FIG. 9, it may be seen that the data command portion of the discrete instruction word which corresponds to the above mentioned adder functions are:

ADS — Add Data to Store, SDS — Subtract Device Data from Store, ANS — AND Device Data with Store, ODS — OR Device Data with Store, and CDS — Compare Device Data with Store. The adder 87 also acts as a transfer bus, passing a data item or a store-unit address without alteration, as for example during the SDD — Store Device Data operation and the LDS — Load Device From Store operation.

Returning to FIG. 3, in conjunction with the timing diagram of FIG. 8, it may be seen that during the address portion of a data cycle for a communicating device 18 operating in the direct mode (P2 Q0 state) the address is passed (FIG. 3d) from the D-bus 205 to the Z-switch 84 in response to a CDBZ control signal. Also during the P2 Q0 state the Z-switch 84 determines the output of the adder 87, therefore, the D-bus signals are passed through the adder 87 to the N-switch 82. The CXTN control signal is enabled to pass the adder output signals comprising store-unit address signals via the N-bus 248 to the address switch 142 of the system controller 14. During store and load cycles (SDD and LDS respectively) data items are switched directly through the adder 87; the arithmetic unit 80 performs no data-altering function.

During a load cycle (LDS) data from the store unit 12 is transferred from the H-register 90 directly onto the data lines 222 bypassing the arithmetic unit 80. During a compare data-cycle transaction (CDS) a data item from the store unit 12 is switched via the H-register 90 and the Y-switch 92 to the adder 87.

A data cycle transaction begins during control state P2 Q0 (FIG. 8), which state is common to all data cycles. At the beginning of the P2 Q0 control state, the condition of the single precision/double precision bistable RL05 is established and logic 89 (FIG. 3d) in response to the BDO2 character code signal on the D-bus 205. A double-precision Add Data to Store — Interrupt on Overflow cycle (ADS SOF) (see FIG. 9) is used in the following discussion as representative of a specific read/alter/rewrite double cycle. It will be assumed that the interrupt condition is not satisfied.

During the P2 Q0 logic state the $REQA store-unit request pulse is transferred from the control & timing unit 70 to a unit request and priority 145 in the system controller 14. The unit request and priority logic 145 resolves conflicts in store-unit requests from the active units in the data processing system, viz: in the embodiment described, the central processor 10 and IOM 16. The unit request and priority logic 145 upon selecting the IOM 16 for a store unit cycle generates and transfers signals SELA to a control logic 140 in the system controller 14 and signal FSLA to a command switch 143. The command switch 143 receives the CMDAO–3 signals from the control & timing unit 70 of the IOM 16 and, in response to the FSLA signal, transfers the CMDAO–3 signals to a command register 141 in the system controller 14. The CRO–3 command-register signals representative of a store-unit cycle request from the IOM 16 are transferred into the control logic 140 of the system controller by a QREC pulse generated in response to the SELA signal from the unit request and priority 145. The control logic 140 transfers the store unit cycle request to the store unit 12 via an interface bus 240.

The control logic 140 also generates appropriate control signals and timing pulses for distribution to the various elements within the system controller 14 such as the address switch 142 an input data switch 144, an output data switch 146, and an interrupt logic 148. Reference is again made to the previously mentioned U.S. Pat. No. 3,413,613 for a more complete description and details of the operation of a typical system controller, such as the system controller of the present invention.

During the P2 Q0 state (FIG. 8) the store-unit address is transferred from the IOM 16 through the address switch 142 to the store unit 12. The control unit 140 of the system controller 14 generates a signal $MAVA and transfers it to the control & timing unit 70 of the IOM 16 via the signal line 244. The $MAVA pulse notifies the IOM 16 that the system controller 14 has received the store unit address signals, and that the IOM may disable the address signals on the D-bus 205 and supply data signals. The control & timing unit 70 of the IOM is, therefore, responsive to the $MAVA pulse to disable the BADR signal on the signal bus 225 to the sequence control & timing 35 of the control unit 28. Disabling the BADR signal ($\overline{BADR}$ enabled) enables data signals from the receive shift register & buffer 32 (FIG. 3f) onto the D-bus 205. The control & timing unit 70 of the IOM is also responsive to the $MAVA signal to change the control state of the IOM from P2 Q0 and P2 Q1 (FIG. 8).

During the P2 Q1 state of the IOM the system controller 14 fetches the store-unit data item specified by the address sent to the store unit from the communicating device as previously described. The system controller 14 notifies the IOM 16 that the data item is available on the data lines 247 by generating a $MDTA pulse in the control logic 140 and transferring the pulse to the control & timing unit 70 of the IOM 16 via a signal line 249. The control & timing unit 70 is responsive to the $MDTA pulse to advance the control state of the IOM to P2 Q2, and to generate a control pulse $HHH. The $HHH pulse enables the data item from the store unit 12 into the H-register 90 of the IOM 16 (FIG. 3d). During the P2 Q2 logic state the DY00–17 and DZOO–17 inputs to the adder 87 are enabled. The adder Y-inputs are comprised of the store-unit data item enabled through the Y-switch 92 by the CHBY control signal. The CHBY signal is enabled by the control & timing unit 70 in response to the ADS decode signals during the P2 Q2 logic state. The adder 87 Y-inputs are comprised of an input data item enabled through the Z-switch 84 by the CDZB control signal enabled similarly as the CHBY signal.

Thus, the RH00–17 signals and the BD00–17 signals are presented to the adder 87, respectively, as the Y and Z inputs. The $MDTA pulse (FIG. 8) generated at the end of the P2 Q1 logic state is circulated through the $CD delay network of the control & timing unit 70 during the P2 Q2 logic state. The delay is sufficient to allow the adder to perform the prescribed operation, in the example described, the addition of two data items. The sum is available to the N-switch 82 as the adder output when the $CD pulse (delayed $MDTA) emerges from the $CD delay network during the P2 Q2 state. The control & timing unit 70 is responsive internally to the $CD pulse to generate a $MDP pulse for transfer to the control logic 140 of the system controller 14 as an indication that the altered data is available on the N-bus 248.

The results of the data operation performed in the adder 87 are available to the data check logic 88. The results that may be sensed by the data check logic include those represented by the signals DZER, DNEG, and DOFL. The DZER signal is generated by the data check logic 88 if the result of the data operation performed, i.e., the adder output signals, is zero. The DZER signal is also generated during a store operation if the data item is zero, even through no data altering occurs. Similarly, the data check logic 88 generates the DNEG and DOFL signals in response to adder arithmetic results, respectively, of a negative data item and an arithmetic overflow.

If the result of the operation being described is zero, the $MDP pulse from the control & timing unit 70 and the DZER signal from the data check logic 88 are combined to enable bistable RL04 of the indicator register and logic 89.

The representative cycle being described is a double precision cycle. A bistable FMDP in the control & timing unit 70 is enabled by a combination of the $MDP signal and the RL05 signal to indicate that the first half of the double precision data item has been sent back to the store unit 12. Since the indicator bistable in the indicator register and logic 89 cannot be valid until the desired operation has been performed on the entire 36-bit word, only the zero data condition (DZER) is detected in the data check logic 88 for the lower half (bits 18–35) of the 36-bit altered data item. Thus, if the I-bus data added to the H-register data results in eighteen 0-bits in the adder 87, the DZER signal is generated by the data check logic 88 and the zero indicator bistable RL04 is enabled in the indicator register and logic 89 of the arithmetic unit 80. If the sum of the two 18-bit data words produces a carry out of the most significant bit position of the adder 87 the carry must be passed on to the next most significant data bit to be added. The carry, therefore, is saved in a bistable FCRY in the data check logic 88 to be used in the addition of the upper half (bits 00–17) of the double precision data word.

After the system controller 14 receives the first half of the altered data item and stores it in the store unit 12, the control logic 140 fetches the second half (upper) of the 36-bit data item and enables the data-item signals onto the data lines 247. The control logic 140 also generates a second $MDTA pulse which is transferred to the control & timing unit 70 and the IOM 16. The second MDTA pulse serves a similar function as the first, viz: to change the control state of the IOM (to P2 Q3), to generate a $HHH pulse to enable the second half of the 36-bit data item into the H-register 90, and after an appropriate delay in the $CD delay network sufficient to allow the adder to perform the prescribed operation, to generate a $CD pulse. Again during the P2 Q3 state, just as during the P2 Q2 state, the Z-switch 84 in response to the CDBZ signal allows the contents of the D-bus to pass the adder as the Z inputs, and the Y-switch in response to the CHBY signal passes the contents of the H-register as the Y-inputs to the adder 87. When the $CD pulse is generated, the sum of the upper 18-bits of the 36-bit data item is available at the adder output. The timing & control unit 70 generates the $MDP pulse to notify the control logic 140 of the system controller 14 that the second half of the altered data item is available on the N-bus 248. The FMDP bistable in the control & timing unit 70 is disabled in response to the second $MDP pulse to allow the data check logic 88 to function and specify the condition of the 36-bit sum in the indicator register and logic 89. The sign of the 36-bit data item is checked by examining bit 0 of the adder output (the most significant bit of the 36 -bit data item). If the absolute value of the summation was a negative number, the DNEG signal is enabled by the data check logic. The DNEG signal serves to enable the RL03 bistable and the indicator register and logic 89. If the 36-bit addition produced a result larger than the largest allowable number the data check logic 88 enables signal DOFL. Both indicator bistables RL03 and RL04 in the indicator register and logic 89 are enabled in response to the DOFL signal. The enabled RL03 and RL04 bistables are encoded in the indicator register an logic 89 as a BOFL signal which is transferred via the indicator signal bus 220 to the microinstruction control 40 of the control unit 48.

If the result of the addition of the second half (upper) of the 36-bit data items was zero, the zero indicator bistable RL04 in the indicator register and logic 89 will remain in the same condition as generated by the results of the addition of the lower half of the data. If the result of the addition of the lower 18-bits had been zero, the RL04 indicator would have been set by the first $MDP pulse. If the result of the addition of the upper half of the data is other than zero, the RL04 bistable would be disabled, indicating that the entire 36-bit data result was not zero.

When the system controller 14 has stored the second half (upper) of the 36-bit altered data item in the store unit 12 the control logic 140 generates a $MDTA pulse to notify the control & timing unit 70 of the IOM 16 via signal line 249 that the data item has been received. During the P2 Q3 logic state (FIG. 8) the $MDTA pulse serves to generate the $LA pulse in the control & timing unit 70 as previously described, to terminate the cycle.

The example discrete instruction used for the foregoing explanation utilized a data-command field containing an ADS — Add Data to Store command and an interrupt-command field SOF — Interrupt on Overflow. If the condition specified by the interrupt command field, viz, arithmetic overflow had occurred, the indicator register and logic 89, see FIG. *3d*, would have enabled a single DECL and transferred the signal to the timing & control unit 70 via a signal line 93. The DECL signal enabled during the P2 logic state is representative of a satisfied interrupt condition. The enabled DECL signal serves, upon completion of the data cycle, to advance the major-state counter to the P3 state, an interrupt cycle.

In the event that the condition specified by the interrupt-command portion of the discrete-instruction word is satisfied the appropriate indicator signal is transferred from the indicator register and logic 89 via the indicator signal bus 220 to the microinstruction control 40, see FIG. *3e*, of the discrete-instruction generator 26. For example just described the indicator signal for the overflow condition is the BOFL signal. Within the bounds of the parameters established in the configuration logic unit 38, the microinstruction control 40, which includes the command generator 46 and the address generator 48, is responsive to the signals on the indicator bus 220 to generate a new discrete-instruction word and a next-address. The instruction set used by a particular communicating device 18 may be internally wire into the discrete-instruction generator 26 or may be contained in a read-only store 42 as shown in FIG. 3*e*.

Referring now to FIG. 10 in conjunction with FIG. 3, a single precision read/alter rewrite cycle will now be described. A single precision Subtract Device Data from Store —Interrupt on Data Zero (SDS–SDZ) is used as a representative discrete instruction. It will be assumed that the interrupt condition specified by the interrupt command field, viz, an arithmetic result of zero, is satisfied. At the beginning of the P2 Q0 control state (FIG. 10), the condition of a single precision/double precision bistable RL05 is established. The RL05 signal is not enabled for a single precision operation, thus establishing the condition for terminating the P2 control state upon completion of the P2 Q2 portion of the major cycle.

During the P2 Q2 control state common to all data cycles, the $REQA store unit request pulse, the discrete instruction decodes, and a store-unit address are transferred from the IOM16 to the system controller 14, in a manner previously described. During the P2 Q1 state, which is the data portion of a store-unit address/data cycle, the store-unit data item specified by the address set to the system controller during the P2 Q0 control state is retrived from the store unit and transferred to the H-register 90, see FIG. 3*d*. Concurrently with the transfer of a store-unit data item to the H-register 90, an input data item is transferred from the receive shift register and buffer 32 via the I-bus 207 to the Z-switch 84. During the subtract operation execution which is effected during the P2 Q2 control state (FIG. 10), the I-bus signals are inverted and added to the signals from the H-register. The subtract algorithm of the arithmetic unit 80 is a 2's complement operation, and there for an end-carry from the adder 87 carry logic is added to the lest significant bit to complete the subtraction. The store unit data item comprising the RH00–17 H-register signals is transferred to the adder 87 via the Y-switch 92 as the DY00–17 Y-inputs. The H-register signals are enabled through the Y-switch in response to the CHBY control signal. The CHBY control signal is logically derived in the control & timing unit 70 during the P2 Q2 control state from the SDS data-command signals generated by the data cycle decode 72. The adder 87 Z-inputs are provided by transferring the $\overline{\text{BI00-17}}$ complemented I-bus signals from the inverts 85 through the Z-switch 84 in response to control signal CCTZ. The CCTZ control signal is logically derived in the control & timing unit 70 during the P2 Q2 control state from the SDS data-command signals generated by the data cycle decode 72.

As previously described during the add operation, the resultant data item of the arithmetic operation, in this case a subtract operation, is available at the adder outputs when the $CD pulse (delay 0MDTA), see FIG. 10, emerges from the $CD delay network during the P2 Q2 control state. The control & timing unit 70 generates the $MDP pulse in response to the $CD pulse, thereby notifying the system controller 14 that the altered data is available on the N-bus 248.

In the example being described, it is assumed that the results of the subtraction operation are zero. Consequently, at $MDP time during the P2 Q2 logic state the data check logic 88, see FIG. 3*d*, senses the zero result from the adder 87 and generates the DZER signal which is transferred to the indicator register & logic 89. The indicator register & logic 89 enables a BZER signal and transfers it via the indicator bus 220 to the micro-instruction control 40 of the discrete instruction generator 26 (FIG. 3*e*). The indicator register & logic 89 in response to the DZER signal from the data check logic 88, also generates a DECL signal which is transferred to the control & timing unit 70 via the signal line 93.

When the final $MDTA pulse, see FIG. 10, of the P2 data cycle is received from the system controller 14, the control & timing unit 70 responds to the $MDTA pulse and the DECL signal to advance the control state counters to P3 Q0, an interrupt cycle. The DECL signal is thus representative of a satisfied interrupt condition, and serves to initiate the execution of the interrupt command portion of the discrete instruction word. It may be recalled that the discrete instruction word still contained in the T-register 75 during the P3 Q0 control state was placed there by the $TRS pulse generated in response to the $CD pulse, at the termination of the P0 Q0 control state. The $MDTA pulse which serves to change the control state to P3 Q0 is circulated in the $CD delay network of the control & timing unit 70, see FIG. 3*c*, to allow time for the control state circuits to settle. When the $CD pulse is generated, the control & timing unit 70 generates and transfers the $REQA pulse to the unit request and priority logic 145 of the system controller. Concurrently, the CMDA0–3 signals representative of a SXC set interrupt cell command are transferred via the signal bus 246 to the command switch 143 of the system controller 14. As previously stated, during the Q0 portion of a new major cycle a store-unit address is sent to the system controller 14 by the IOM 16 via the N-bus 248. The address signals sent to the system controller during the P3 Q0 control state are not a representative of a true data-unit address, but represent an interrupt level specified by the interrupt level bits of the discrete instruction word (see FIG. 9). The interrupt level signals do not pass through the adder as would a normal address, but are switched directly from the T-register 75 as the RT00–17 signals through the N-switch 82 in response to a CTTN control signal. The CTTN signal is generated by the timing & control unit 70 and is logically derived from the decode of the SXC command and the P3 Q0 control state counter signals. The IOM remains in control state P3 Q0 until the system controller 14 acknowledges the receipt of the previously mentioned IOM signals transferred thereto during the P3 Q0 state. The system controller acknowledges receipt of the IOM signals by generating a $MAVA pulse in the control logic 140. The $MAVA pulse is transferred via the signal line 244 to the control & timing unit 70 and advances the IOM to the control state P3 Q1. The $MAVA pulse is delayed in the $CD delay network and regenerated as a $CD pulse. During the P3 Q1 control state, the $CD pulse serves to enable a CETN control signal which gates the DE00-15 signals from the interrupt decode 74 through the N-register 82 to the system controller 14 via the N-bus 248. Of the 16 DE00-15 signals, only one is enabled as an indication of the interrupt sub-level encoded in the discrete instruction word. For a more detailed description of the interrupt feature of the present system, reference is again made to the aforementioned U.S. Pat. No. 3,665,415.

In the summary of the interrupt feature as it pertains to this invention, the communicating device 18 may transfer an interrupt indication unconditionally to the central processor by generating an SXC code in the interrupt command field of the discrete-instruction word. An interrupt indication conditional upon certain specified results which occur in the arithmetic unit 80 of the IOM 16 may also be generated by the communicating devices 18 as part of the discrete-instruction word placed on the I-bus at the time the communicating device becomes active. At the completion of the specified data cycle the IOM 16 tests for the conditional result specified. If the condition is satisfied the IOM 16 performs an interrupt cycle for the communicating device 18 to set the proper store-unit interrupt cell as indicated by the interrupt level and sub-level signals which are contained in the discrete instruction word from the communicating device 18.

Returning to FIG. 10, the P3 interrupt cycle is terminated in a similar manner as other cycles when the $LA pulse is generated by the last pulse detector network of the control & timing unit 70.

Two data altering instructions, viz, the add and subtract, have been used to explain the operation of the arithmetic unit 80 of the IOM 16. As previously stated, the IOM in response to discrete-instruction words from the communicating devices 18 is capable of controlling the adder to perform logical ORing and logical ANDing of input data items on the I-bus 207 and the D-bus 205, see FIG. 3*d*, with store unit data items transferred through the H-register 90 to the arithmetic unit 80. The output of the adder 87 is the logical OR of the Z-switch 84 and the Y-switch 92. During a logical AND operation the complements of the store-unit data item signals are transferred through the Y-switch 92 in response to the CHTY control signal, while the true I-bus and D-bus signals are gated through the Z-switch 84, respectively, by the CCBZ and CDBZ control signals. The CHTY, CCBZ and CDBZ signals are generated in the control & timing unit 70 during the P2 control state, and are logically derived from the ANS (AND Device Data with Store) decode signals originating in the data cycle decode 72, and the control-state counter signals. During a compare data cycle, no altered data is enabled from the arithmetic unit 80 through the N-switch 82; only the data results are sensed by the data check logic 88 and transferred to the discrete-instruction generator 26.

Figure 11:
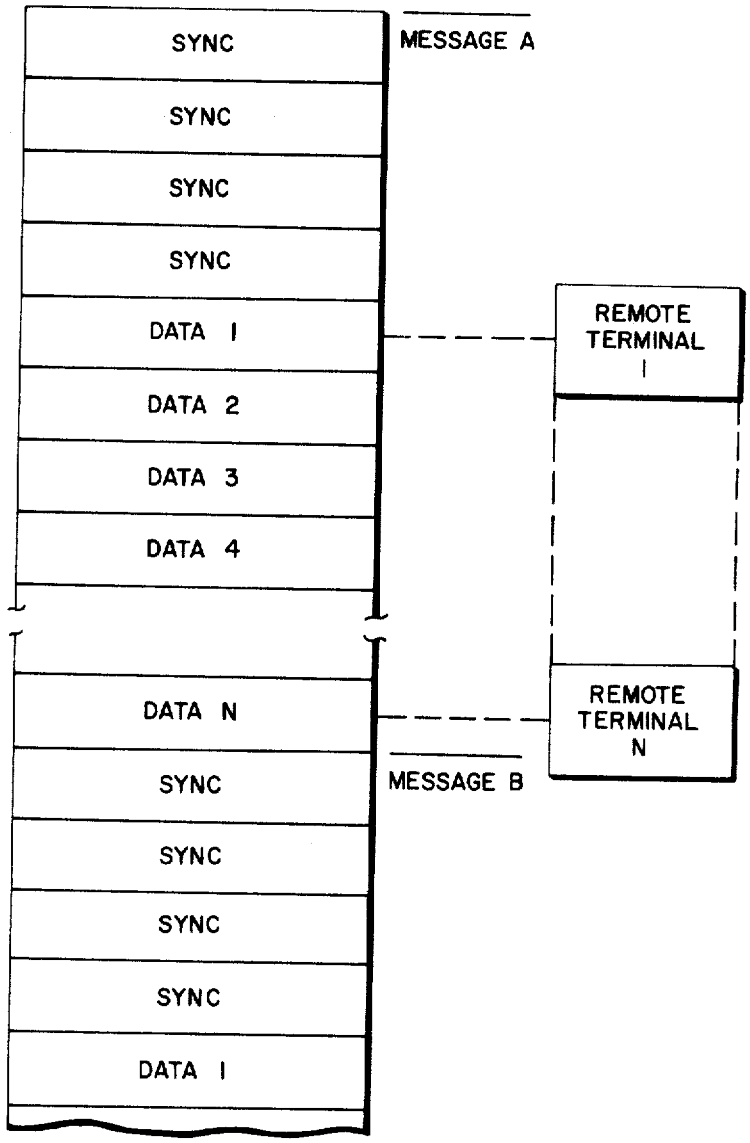
FIG. 11 symbolically represents two contiguous synchronous data communications messages.

The manner in which the present invention may be used within the data processing system as shown in FIG. 3 will now be described with reference to FIGS. 11 and 12. Referring to FIG. 11, there is shown a symbolic representation of two data communications messages, Message A and Message B, forming a part of a contiguous stream of data messages such as may be sent and received by the representative user device 30 (FIG. 3*f*). A typical message structure of a synchronous data communications modem such as that chosen for the representative user device 30 is shown comprising four consecutive sync characters followed by data items labeled Data 1, Data 2, Data 3 . . . through Data N, the next contiguous message in the data stream, Message B, beginning again with sync characters. For the purposes of this discussion, it is assumed that the data messages are being received from a remote communications multiplexer, and each of the data items labeled Data 1, Data 2 . . . through Data N corresponds to a particular remote terminal connected to the remote communications multiplexer. Thus the data item labeled Data 1 corresponds to a remote terminal 1, the data item labeled Data 2 corresponds to a remote terminal 2, etc.

Figure 12A:
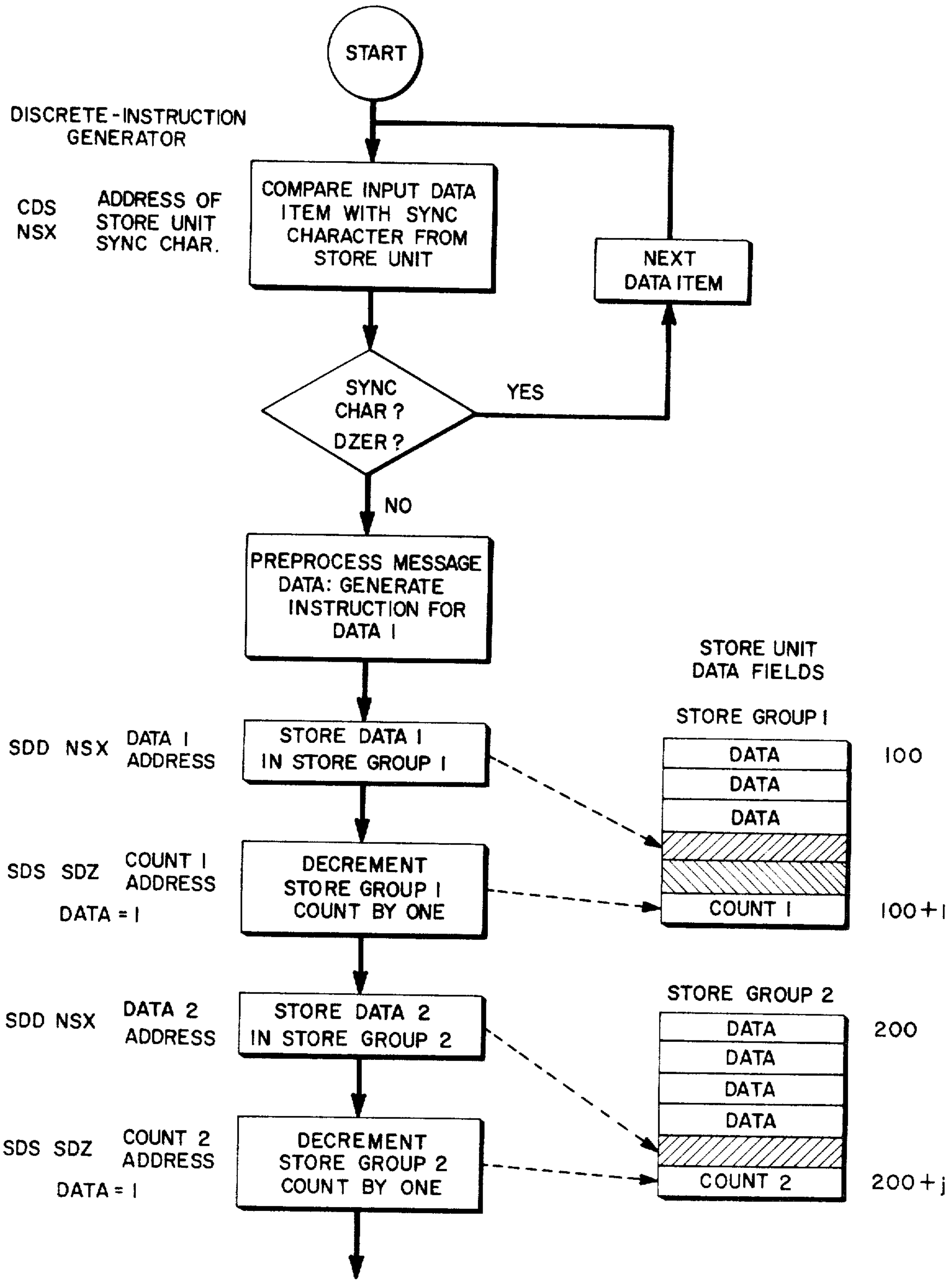
FIGS. 12*a* through 12*c* when arranged as shown in FIG. 12*d* form a flow chart of the operation of the data processing system with the representative communicating device of FIG. 3.
Figure 12B:
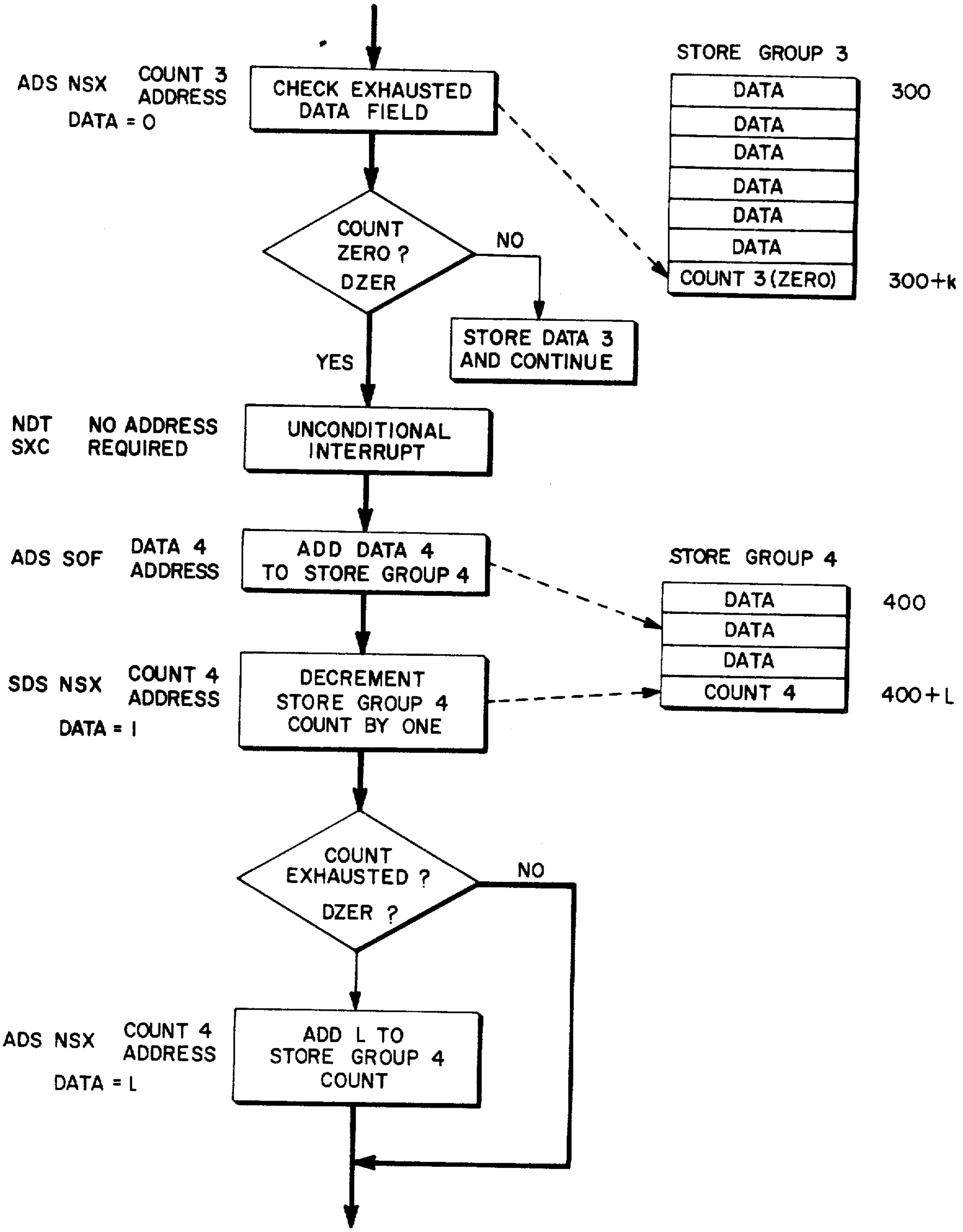
Figure 12C:
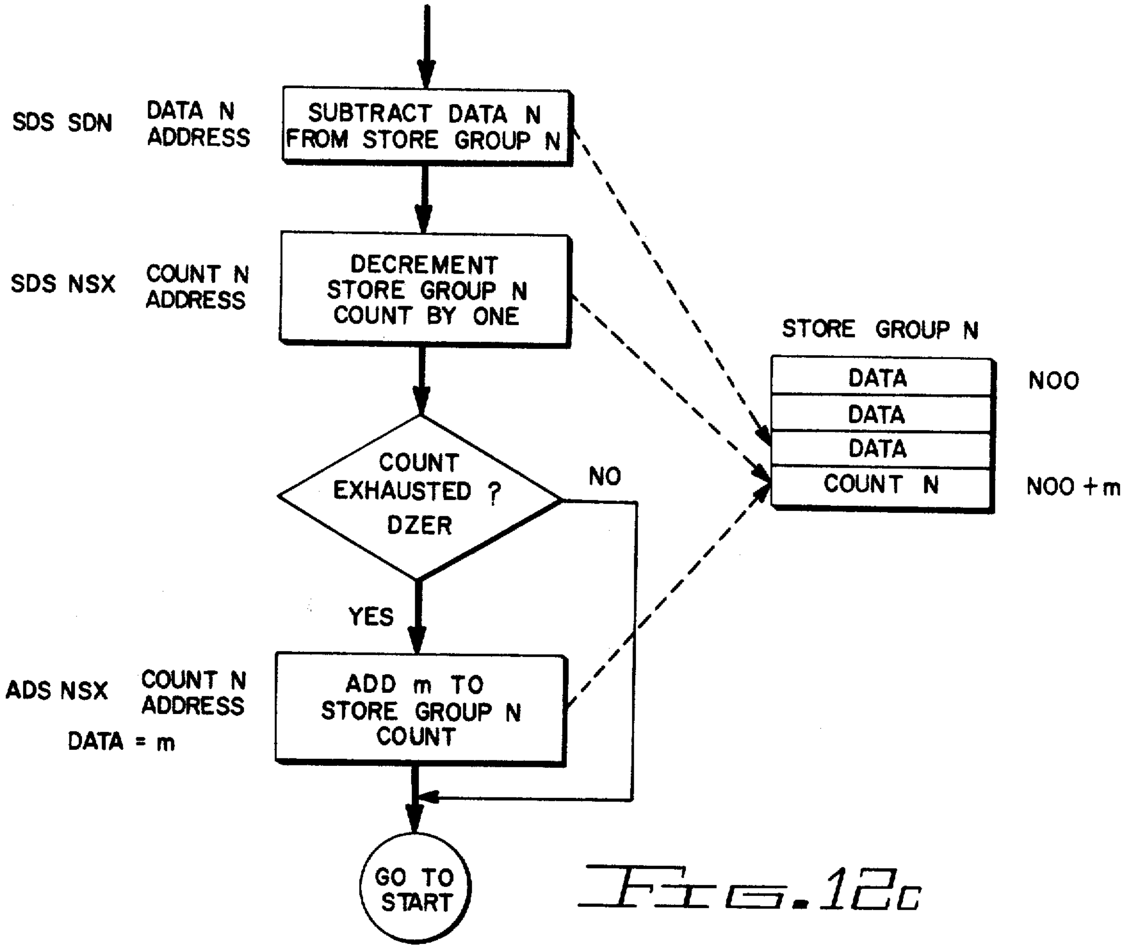
Figure 12D:
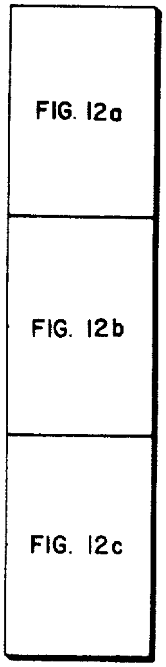
FIG. 12 is a composite drawing in three parts.

Referring now to FIGS. 12*a* through 12*c* which are to be considered a single figure for this general explanation, there is shown a flow chart which illustrates symbolically the manner in which a representative communicating device of the present invention may generate discrete-instruction words and addresses to preprocess each of the data items illustrated symbolically on FIG. 11, individually for each of the corresponding remote terminals. On FIG. 12 there is shown symbolically for each data-item labeled Data 1, Data 2, through Data N, a corresponding store-unit data field, each comprised of a plurality of storage locations termed a store group. The store groups labeled Store Group 1, Store Group 2, through Store Group N, correspond, respectively, to the message data items of FIG. 11 labeled Data 1, Data 2, through Data N. Store Group 1 is shown containing three data items, each a Data 1 data item, received from three contiguous messages in the data stream.

It is assumed that the parameters transferred to the configuration logic unit 38 (FIG. 3*e*) during one or more BFC transactions initiated by the data processing system supervisory program, define a starting address and a length for each store group. The starting addresses are arbitrarily represented on FIG. 12 as 100 for Store Group 1, 200 for Store Group 2, etc. The length of each store group is represented on FIG. 12 by a literal symbol, viz: *i* for Store Group 1, *j* for Store Group 2, etc.

Associated with each store-unit data field is a data item called a count representative of the length of the store group. Each store unit data field is thus comprised of a store group and a count data item, the count data item being the last data item in each of the respective store unit data fields. The starting address of the count data item, therefore, is the starting address of the corresponding store group, plus the length of the store group. For example, as shown on FIG. 12*a*, the store-unit address for the count data item of Store Group 1, labeled Count 1, is 100 plus *i*.

Adjacent and to the left of each of the flow-chart blocks of FIG. 12 there is shown the symbolic data command (see FIG. 9) interrupt command, store-unit address, and if applicable an input data item issued by the discrete-instruction generator for the corresponding flow-chart block.

Referring specifically now to FIG. 12*a*, the preprocessing of the first part of a data message stream, i.e., the detection of sync characters, is accomplished by comparing the input data items with a predetermined sync character from the store unit. The store-unit address of the predetermined synch character comprises a portion of the operating parameters supplied to the communicating device during a BFC transaction. The discrete-instruction generator issues a CDS NSX instruction (Compare Device Data with Store — No Interrupt Cycle), along with the store-unit address of the predetermined sync character. If the input data item is a sync character a compare is detected and the DZER signal is enabled as indicated by the YES branch from the SYNC CHAR decision block of FIG. 12*a*. The next data item is then accessed and the discrete-instruction generator again issues the CDS NSX instruction to compare the input data item with the sync character from the store unit. When the first non-sync data item of the message being preprocessed (Data 1) is accessed, no compare will result, and the communicating device under control of the discrete-instruction generator proceeds to preprocess the message data.

It is assumed that for Store Groups 1 through 3 of FIG. 12, the corresponding input data items are stored successively in their respective store groups until the store unit data field is filled. Upon detecting a filled store group the interrupt command portion of a discrete instruction is executed as an indication to the central processor that a particular store group is filled and the data is available for processing.

Continuing on FIG. 12*a*, Data 1 is stored in Store Group 1 in response to an SDD NSX instruction (Store Device Data — No Interrupt Cycle) in the next available Data 1 store-unit address location specified by the discrete-instruction generator. Locations in Store Group 1 which are available for storage of data are represented by cross-hatching. After storing Data 1, the discrete-instruction generator issues an SDS SDZ instruction (Subtract Device Data From Store — Interrupt on Data Zero) along with the Count 1 address, followed by a data item representing a count of one. The SDS data command serves to decrement the Store Group 1 count by subtracting one from the existing count. The SDZ conditional interrupt command serves to effect the issuance of an interrupt indication to the central processor if the count is decremented to zero.

Continuing down the FIG. 12*a* flow chart, a similar operation is performed, storing Data 2 in the last available space in Store Group 2. Consequently, when Count 2 is decremented in response to the SDS command from the discrete-instruction generator a zero result is detected and the SDZ interrupt command portion of discrete-instruction word is executed for Store Group 2. The BZER indicator signal generated by the IOM 16 conditions the micro-instruction control 40 (see FIG. 3*e*) of the discrete-instruction generator 26 to check for a restored Count 2 when the subsequent Data 2 input data item is received for storage. This operation is described in more detail in the following discussion relating to Store Group 3.

For the Store Group 3 portion of the flow chart of FIG. 12*b* it is assumed that the Data 3 input data item of the previous message filled Store Group 3, that the count was decremented to zero, and that an interrupt indication was transferred to the central processor. It is further assumed that the central processor failed to respond to the interrupt indication and that Count 3 remains zero. Having been conditioned to check for the restoration of storage space for Store Group 2, the discrete-instruction generator issues an ADS-NSX discrete instruction (Add Data to Store — No Interrupt Cycle) along with the Count 3 address. Following issuance of the discrete instruction, the discrete-instruction generator also supplies the input data item of zero to be added to Count 3. A data operation result of zero indicates that Count 3 was not restored by the central processor, i.e., the central processor failed to respond to the previous interrupt by retrieving the preprocessed Store Group 3 data for processing. The discrete-instruction generator responds to the DZER data result by issuing an unconditional interrupt and then proceeding to preprocess the remainder of the data message, moving to Data 4.

The preprocessing of the input data items for Store Group 4 and Store Group N represents an alternate method of preprocessing input data items as opposed to the method previously described wherein data items were merely stored in a particular store unit data field. Store Group 4 and Store Group N contain store-unit data items placed there by a unit of the data processing system other than the communicating device supplying input data items. The input data items from the communicating device are combined with the Store Group 4 and Store Group N data items to produce altered data items in response to the data-command portion of a discrete instruction from the communicating device. In the embodiment described an input data item from the communicating device may be added, subtracted, ANDed, or ORed with the store-unit data item to produce an altered data item. A conditional interrupt based on the results of the arithmetic operation specified by the data-command portion of the discrete-instruction word may be specified in the interrupt command portion of the discrete instruction word. Thus, cumulative data may be gathered within the bounds specified by the central processor supervisory program in a BFC sent to the communicating device.

Continuing on FIG. 12*b*, Store Group 4 is shown having three data items to which input data items from the communicating device are added successively, the interrupt-command portion of the discrete-instruction word being conditional upon a data operation which results in arithmetic overflow. The latter is accomplished with the instruction ADS-SOF Add Data to Store-Interrupt on Overflow. During the preprocessing of the input data items for Store Group 4, the Count 4 data item is decremented by a count of one for each input data item. The exhausted count field is ten restored to a full count by adding the store-group field length to the count, without a conditional interrupt. The count field in the operation being described, therefore, functions as a ring counter rather than a data-field fill indicator, as with Store Groups 1, 2 and 3.

Continuing with the Store Group 4 example of FIG. 12*b*, after performing the add operation and storing the Data 4 altered data item in the Store Group 4 location specified by the Data 4 Address (indicated by the dashed line), the discrete-instruction generator issues an SDS NSX (Subtract Device Data from Store-No Interrupt Cycle) discrete-instruction word to decrement Count 4 by one. The discrete instruction generator in addition to supplying the instruction word supplies the data item for the decrement operation, viz: a numerical constant, one. The data operation result is then checked for an exhausted count as indicated by the DZER signal. The heavy line indicates the path taken in this case with no exhaust of the count 4 field, i.e., the NO branch, or DZER not enabled. The instruction for restoring count 4 to a full count (ADS NSX) is bypassed.

The data operation performed for Store Group N, see FIG. 12c, is a subtract operation with an interrupt conditional upon a negative arithmetic result (SDS SDN). For the Store Group N example an input data item is subtracted from the last store unit data item in the store group, as indicated by the dashed line directed to that data item. Count N is then decremented, exhausting the count, and the discrete-instruction generator is responsive to the DZER data operation result to generate an ADS NSX (Add Device Data to Store — No Interrupt Cycle) discrete-instruction word along with the Count N address to restore Count N to a full count. Following issuance of the discrete-instruction word, the discrete-instruction generator supplies the input data item: an arithmetic constant, *m*.

Figure 13:
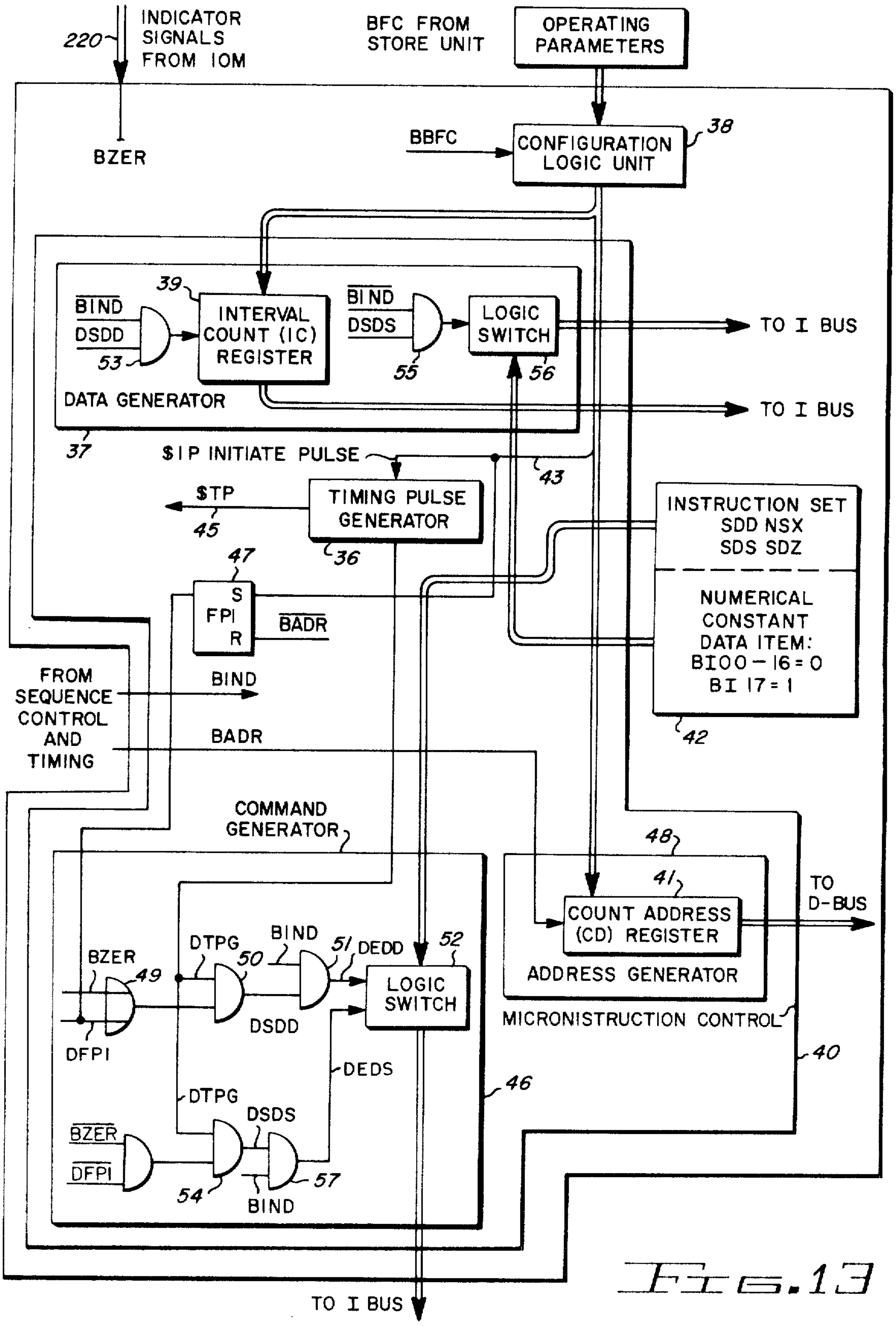
FIG. 13 is a block diagram of an alternate embodiment of a communicating device that utilizes the present invention.

Reference is now made to FIG. 13 which sows an alternate embodiment of a communicating device 18, an interval timer, which incorporates the principles of the present invention. The interval timer of FIG. 13 comprises the microinstruction control 40 having a timing-pulse generator 36, a data generator 37, the command generator 46, and the address generator 48. The interval timer of FIG. 13 further comprises the configuration logic unit 38 and the read only store 42, which in this embodiment may be a detachable plug-board to allow changing of the instruction set and the numerical constant.

Figure 14:
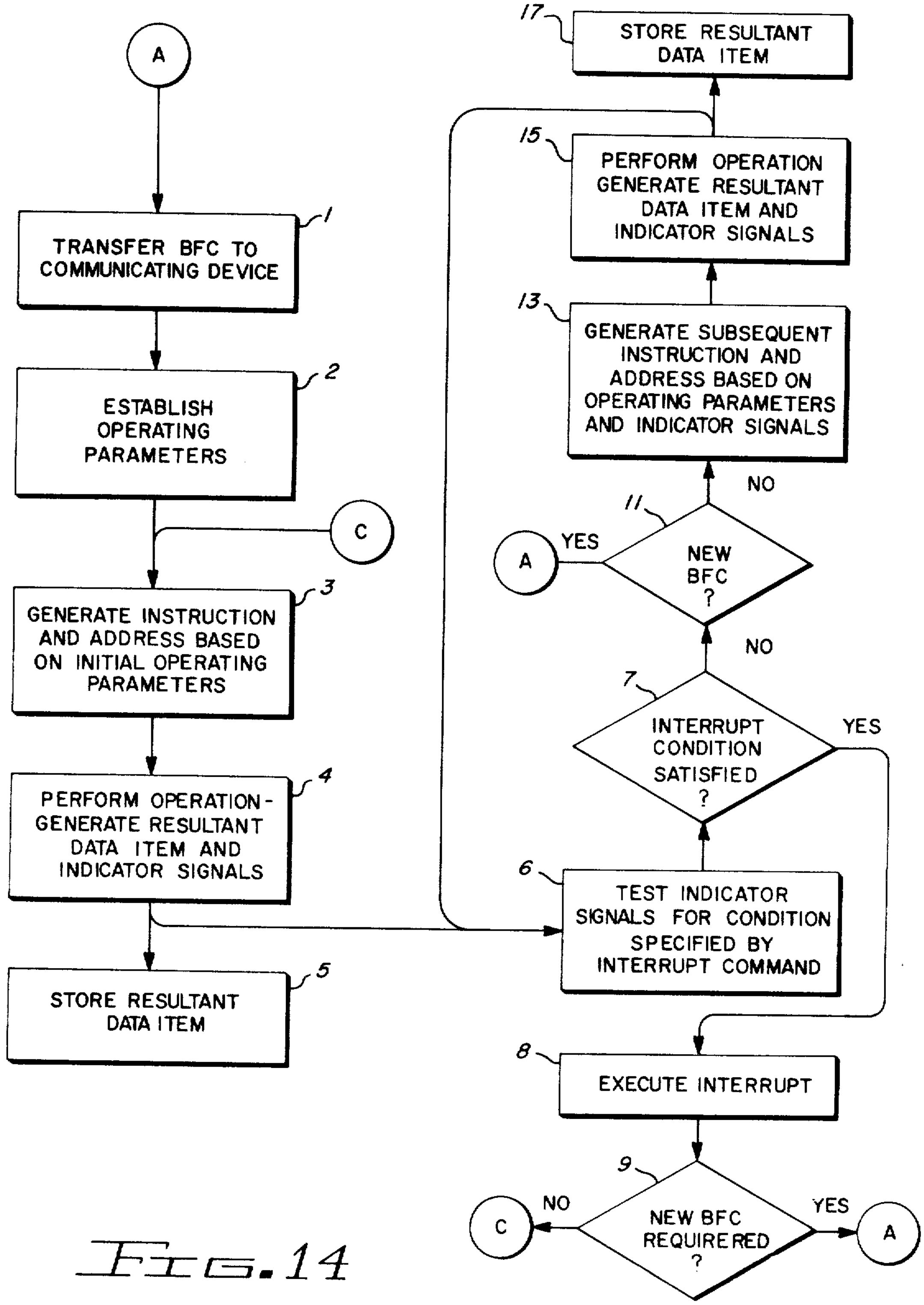
FIG. 14 is a flow chart of the operation of the communicating device of FIG. 13.

Refer now momentarily to FIG. 14 which is a flow chart of the method of operation employed by the interval timer of FIG. 13 in concert with the data processing system of the present invention. While continuing the description of the interval timer of FIG. 13 the discussion will be augmented by referring to the operational flow chart of FIG. 14.

Operating parameters for the interval timer of FIG. 14 are transferred in a broad function command (BFC) (see Blocks 1 and 2 of FIG. 14) from the store unit to the configuration logic unit 38 in a manner previously described. The operating parameters for this embodiment comprise signals representative of a time interval, which signals are stored in an interval count (IC) register 39; a single store-unit address which is placed in a count address (CD) register 41 in the address generator 48; and a $IP initiate pulse transferred via a signal line 43 to the timing pulse generator 36. The $IP pulse serves to enable the timing pulse generator 36 to generate a regularly occurring DTPG signal derived from a timing source internal to the timing pulse generator 36. Concurrently with the rising edge of each DTPG signal, the timing pulse generator 36 issues a $TP pulse which is transferred via a signal line 45 to the sequence control & timing 35 (not shown; see FIG. 3e) to initiate an IOM data transaction cycle. The $IP initiate pulse also enables a FPI first pulse indicator bistable 47 which generates a DFPI signal. The DFPI signal is transferred to the command generator 46 where it serves to enable the generation of the first discrete instruction upon receipt of the BIND signal from the IOM 16. The DFPI signal is transferred to an OR-gate 49 the enabled output of which is ANDed with the DTPG signal from the timing pulse generator 36 in a DSDD AND-gate 50 to produce the DSDD signal. The DSDD signal is combined with the BIND instruction/data enable signal in a DEDD AND-gate 51 to generate a DEDD SIGNAL. The DEDD signal enables an SDD NSX instruction (Store Device Data — No Interrupt Cycle) from the ROS 42 through an instruction logic switch 52 to the I-bus 207. Concurrently with the instruction, the fixed (by operating parameters) output of the CD register 41 is enabled onto the D-bus 205 in response to the BADR address/data enable signal, the latter occurring each store unit cycle (see Block 3, FIG. 14). The BIND and BADR signals are generated in the control & timing unit 70 (FIG. 3c) as previously described in the Data Cycles section of this specification.

When the BIND signal is disabled (see FIG. 8) by the IOM 16 ($\overline{BIND}$ enabled), the DSDD signal from the DSDD AND-gate 50 is ANDed with the $\overline{BIND}$ signal in an AND-gate 53 in the data generator 37 to enable the contents of the IC register 39 onto the I-bus 207 as an input data item. The initial SDD instruction serves to establish an initial interval count as prescribed by the contents of the IC register 39, which count is stored in the store-unit location prescribed by the contents of the CD register 41.

During subsequent cycles of the timing pulse generator 36, the initial count is decremented in a manner described in the ensuing discussion until the count reaches zero, at which time an interrupt indication is sent to the central processor. The entire process of counting the timer interval established by the BFC operating parameters is then repeated until such time that different operating parameters are supplied by action of the central processor.

Concurrently with the generation of the next $\overline{\$SP}$ pulse, the DTPG signal is combined with the $\overline{BZER}$, disabled BZER signal, in a DSDS AND-gate 54 to enable the DSDS signal. The DSDS signal is combined with the BIND instruction/data enable signal in a DEDS AND-gate 57 to generate the DEDS signal. The DEDS signal serves to enable a SDS SDZ discrete instruction (Subtract Device Data From Store-Interrupt on Data Zero) through the instruction logic switch 52 onto the I-bus 207. The store-unit address from the CD register is enabled at the same time onto the D-bus 205 by the BADR address/data enable signal. When the BIND signal is disabled ($\overline{BIND}$ enabled) the discrete instruction is removed from the I-bus. The $\overline{BIND}$ signal is combined with the DSDS signal in an AND-gate 55 of the data generator 37. The output of the AND-gate 55 enables a numerical constant of one, i.e., BI00-16 = 0; BI17 = 1, from the ROS 42 through a data logic switch 56 onto the I-bus 207. The SDS discrete instruction serves to decrement the interval-count store-unit data item contained in the address specified by the CD register 41 by a factor of one. Each time the timing pulse generator 36 generates a DTPG signal, the interval count is decremented by one. The SDS SDZ discrete instruction is reiterated until the interval count reaches zero at which time the interrupt condition specified by the SDZ interrupt command is satisfied. Referring to FIG. 14, the reiteration is represented by repetitive circulation through Blocks 6, 7, 11, 13, 15 and 17, returning to Block 6 to test for the BZER indicator signal. Upon decrementing the interval count to zero, the SDZ Interrupt On Data Zero portion of the discrete-instruction word is executed in the IOM 16 during a P3 data cycle and an interrupt indication is transferred to the central processor (see blocks 7 and 8, FIG. 14).

Returning to FIG. 13, wen the interval count reaches zero, the BZER indicator signal is transferred via the indicator bus 220 to the OR-gate 49 in the command generator 46. The output of the OR-gate 49 enabled in response to the BZER signal is combined in the DSDD AND-gate 50, with the next subsequent DTPG signal from the timing pulse generator 36 to produce the DSDD signal. The DSDD signal serves to generate the SDD NSX instruction as previously described, thus restoring the interval count to the initial configuration prescribed by the operating parameters of the broad function command. The restoration of the interval count corresponds to the re-entry of Block 3 of the FIG. 14 flow chart at point C. If at any time during the reiteration process of the SDS SDZ discrete instruction, i.e., while the interval count is being decremented, a new BFC is received, the $IP initiate pulse enables the FPI bistable 47 resulting in the generation of an SDD NSX discrete instruction during the subsequent DTPG signal period. The latter corresponds on the FIG. 14 flow chart to the re-entry of Block 1 from the decision Block 9 at point A.

While the principles of the invention have now been made clear in the foregoing illustrative embodiments, there will be immediately obvious to those skilled in the art many modifications of structure, arrangement, proportions, the elements, materials and components used in the practice of the invention which are particularly adapted for specific environments and operating requirements without departing from those principles. The appended claims are, therefore, intended to cover and embrace any such modifications, within the limits only of the true spirit and scope of the invention.

What is claimed is:

1. In a data processing system of the type having a store unit with a plurality of addressable storage locations having store-unit data items stored therein including a first instruction set, a central processor for sequentially performing a series of prescribed operations on the store-unit data items in response to the first instruction set, an input-output multiplexer having an arithmetic unit for performing operations in response to a second instruction set, the second instruction having discrete instructions each including a data command field and a conditional interrupt command field, and a communicating device connected to said input-output multiplexer for receiving the processed store-unit data items and for supplying input data items, said communicating device having a discrete-instruction generator for generating the second instruction set, a method for preprocessing input data items, comprising the steps of:

a. transferring a store-unit data item comprising a broad-function command from the store unit to the communicating device;
b. establishing in the discrete-instruction generator operating parameters for the communicating device in response to information contained in the broad-function command;
c. generating in the discrete-instruction generator a first discrete instruction and a first associated store-unit address in response to the established operating parameters;
d. transferring from the store-unit to the arithmetic unit a store-unit data item specified by the first associated store-unit address, and from the communicating device an input data item;
e. performing in the arithmetic unit the operation specified by the data-command field of the first discrete instruction upon the store-unit data item specified by the first associated store-unit address and upon the input data item to generate an altered data item and indicator signals;
f. storing the altered data item in the store-unit;
g. transferring the indicator signals to the discrete-instruction generator;
h. generating in the discrete-instruction generator a subsequent discrete instruction and a subsequent associated store-unit address in response to the transferred indicator signals and to the established operating parameters;
i. transferring from the store-unit to the arithmetic unit a store-unit data item specified by the subsequent associated store-unit address and from the communicating device, a subsequent input data item;
j. performing in said arithmetic unit the operation specified by the data-command field of the subsequent discrete instruction upon the store-unit data item specified by the subsequent associated store-unit address, and upon the subsequent input data item to generate a subsequent altered data item and indicator signals;
k. storing the subsequent altered data item in the store unit;
l. transferring the indicator signals to the discrete instruction generator;
m. testing the generated indicator signals to determine if the condition specified by the conditional interrupt command field of the subsequent discrete instruction is satisfied;
n. executing the interrupt command of the subsequent discrete instruction when the specified condition is satisfied.

2. A method according to claim 1 further comprising between steps (m) and (n) the step of:

repeating steps (h), (i), (j), (k), (l), and (m) until the established operating parameters have been exceeded as determined in the testing step, thereby satisfying the condition specified by the conditional interrupt-command field of the subsequent discrete instruction.

3. In a data processing system of the type having a store unit with a plurality of addressable storage locations having store-unit data items stored therein including a first instruction set, a central processor for sequentially performing a series of prescribed operations on the store unit data items in response to the first instruction set, an input-output multiplexer having an arithmetic unit for performing operations in response to a second instruction set, the second instruction set having discrete instructions each including a data command field and a conditional interrupt command field, a system controller connected to the central processor, to the store unit, and to the input-output multiplexer for controlling the transfer of data items therebetween, and a communicating device connected to the input-output multiplexer for receiving the processed store-unit data items and supplying input data items, the communicating device having a discrete-instruction generator for generating the second instruction set, a method for preprocessing input data items, comprising the steps of:

a. transferring a store-unit data item comprising a broad-function command from the store unit to the communicating device;
b. establishing in the discrete instruction generator operating parameters for the communicating device in response to information contained in the broad-function command;
c. generating in the discrete-instruction generator a first discrete instruction and a first associated store-unit address in response to the established operating parameters;
d. transferring from the store-unit to the arithmetic unit a store-unit data item specified by the first associated store-unit address, and from the communicating device an input data item;
e. performing in the arithmetic unit the operation specified by the data-command field of the first discrete instruction upon the store-unit data item specified by the first associated store-unit address and upon an input data item to generate an altered data item and indicator signals;
f. storing the altered data item in the store-unit;
g. transferring the indicator signals to the discrete-instruction generator;
h. generating in the discrete-instruction generator a subsequent discrete instruction and a subsequent associated store-unit address in response to the transferred indicator signals and to the established operating parameters;
i. transferring from the store-unit to the arithmetic unit a store-unit data item specified by the subsequent associated store-unit address and from the communicating device, a subsequent input data item;
j. performing in said arithmetic unit the operation specified by the data-command field of the subsequent discrete instruction upon the store-unit data item specified by the subsequent associated store-unit address, and upon the subsequent input data item to generate a subsequent altered data item and the indicator signals;
k. storing the subsequent altered data item in the store unit;
l. transferring the indicator signals to the discrete-instruction generator;
m. testing the generated indicator signals to determine if the condition specified by the conditional interrupt command field of the subsequent discrete instruction is satisfied;
n. executing the interrupt command of the subsequent discrete instruction when the specified condition is satisfied.

4. A method according to claim 3 further comprising between steps (m) and (n), the step of:

repeating steps (h), (i), (j), (k), (l), and (m) until the established operating parameters have been exceeded as determined in the testing step, thereby satisfying the condition specified by the conditional interrupt-command field of the subsequent discrete instruction.

5. An improved data processing system of the type including a store unit with a plurality of addressable storage locations having store-unit data items including a first instruction set stored therein, a central processor converted to said store unit for processing the store-unit data items in response to the first instruction set, an input-output multiplexer connected to said store unit, a communicating device connected to the input-output multiplexer for receiving the processed store-unit data items from the store unit and supplying input data items for storage in the store unit, and means in said input-output multiplexer responsive to stimuli from the central processor for transferring a broad-function command from the store unit to the communicating device, wherein the improvement comprises:

data-altering means within the input-output multiplexer for performing preprocessing operations on the input data items; and a discrete-instruction generator within the communicating device responsive to information in the broad-function command and to the data-altering means to generate a second instruction set, said data-altering means performing said preprocessing operations in response to said second instruction set.

6. An improved data processing system of the type including a store unit with a plurality of addressable storage locations having store-unit data items including a first instruction set stored therein, a central processor connected to the store unit for sequentially performing a series of prescribed operations on the store-unit data items in response to the first instruction set, an input-output multiplexer connected to the store unit, a plurality of communicating devices connected to the input-output multiplexer for receiving the processed store-unit data items from the store unit and supplying input data items for storage in the store unit, and means in said input-output multiplexer responsive to stimuli from the central processor for transferring a broad-function command from the store unit to a selected one of the plurality of communicating devices, wherein the improvement comprises:

data-altering means within the input-output multiplexer for performing preprocessing operations including arithmetic operations on the store-unit data items and the input data items;

a discrete-instruction generator within the selected communicating device responsive to information in the broad-function command and to the data-altering means to generate a second instruction set comprising a plurality of discrete instructions, said data-altering means performing said preprocessing operations in response to said second instruction set.

7. An improved data processing system of the type including a store unit with a plurality of addressable storage locations having store-unit data items including a first instruction set stored therein, a central processor connected to the store unit for sequentially performing a series of prescribed operations on the store-unit data items in response to the first instruction set, an input-output multiplexer connected to the store unit, a plurality of communicating devices connected to the input-output multiplexer for receiving the processed store-unit data items from the store unit and supplying input data items for storage in the store unit, and means in said input-output multiplexer responsive to stimuli transferred from the central processor for transferring a broad-function command having operating parameters from the store unit to a selected one of the communicating devices, wherein the improvement comprising:

data-altering means within the input-output multiplexer for performing preprocessing operations including arithmetic operations on the input data items;

an indicator register within the input-output multiplexer responsive to the arithmetic results of the preprocessing operation for generating indicator signals; and a discrete-instruction generator within the communicating device for generating a plurality of discrete instructions having an interrupt command field, said discrete-instruction generator responsive to the operating parameters in the broad-function command and to the indicator signals to generate the plurality of discrete instructions for transmission to said data-altering means, said data-altering means performing the preprocessing operation in response to the discrete instructions.

8. An improved data processing system as described in claim 7 wherein the data-altering means further includes means responsive to the indicator signals for executing the command in the conditional interrupt command field of one of the plurality of discrete instructions to notify the central processor of a need for new operating parameters.

9. An improved data processing system of the type including a store unit with a plurality of addressable storage locations having store-unit data items including associated instruction set stored therein, a central processor for sequentially performing a series of prescribed operations called a program on the store-unit data items in response to the instruction set and having means for interrupting the program, an input-output multiplexer, a system controller connected to the central processor, to the store unit, and to the input-output multiplexer for controlling the transfer of data items therebetween, a plurality of communicating devices connected to the input-output multiplexer for receiving the processed store-unit data items from the store unit and supplying input data items for storage in the store unit, and means in said input-output multiplexer responsive to stimuli transferred from the central processor to the input-output multiplexer for transferring a broad-function command having operating parameters from the store unit to a selected one of the plurality of communicating devices, wherein the improvement comprises:

data-altering means within the input-output multiplexer for performing preprocessing operations including arithmetic operations on the input data items, the preprocessing operations producing arithmatic results;

means connected to said data-altering means responsive to the arithmatic results of the preprocessing operations for generating indicator signals;

a discrete-instruction generator within the selected communicating device for generating a plurality of discrete instructions, each having an instruction part and a store-unit address part, the instruction part including a data command field and a conditional interrupt command field, said discrete-instruction generator responsive to the operating parameters in the broad-function command and to the indicator signal generating means to generate discrete instructions for transfer to the data-altering means, said data-altering means performing the preprocessing operation in response to the discrete instructions.

10. An improved data processing system as described in claim 9 wherein the data-altering means further includes means responsive to the indicator signals for executing the command in the conditional interrupt command field of one of the plurality of discrete instructions to notify the central processor of a need for new operating parameters.

* * * * *